US012405550B2

(12) United States Patent
Koyanagi et al.

(10) Patent No.: US 12,405,550 B2
(45) Date of Patent: Sep. 2, 2025

(54) DEVELOPING DEVICE, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Takashi Koyanagi, Shizuoka (JP); Kineo Takeno, Shizuoka (JP); Takuho Sato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 17/687,146

(22) Filed: Mar. 4, 2022

(65) Prior Publication Data

US 2022/0291607 A1 Sep. 15, 2022

(30) Foreign Application Priority Data

Mar. 10, 2021 (JP) ................................ 2021-038262

(51) Int. Cl.
*G03G 15/08* (2006.01)
*G03G 5/10* (2006.01)
*G03G 9/083* (2006.01)
*G03G 15/10* (2006.01)

(52) U.S. Cl.
CPC ......... *G03G 15/0818* (2013.01); *G03G 5/105* (2013.01); *G03G 9/083* (2013.01)

(58) Field of Classification Search
None
See application file for complete search history.

(56) References Cited

U.S. PATENT DOCUMENTS 3,093,039 A * 6/1963 Rheinfrank ............ G03G 15/22 399/307
4,990,963 A * 2/1991 Yamamoto ......... G03G 15/0818 399/286

(Continued)

FOREIGN PATENT DOCUMENTS

EP 1467259 A1 10/2004
EP 3588194 A1 1/2020
EP 3719580 A1 10/2020

(Continued)

OTHER PUBLICATIONS

CAS PTGL 1000 (Year: 2024).*

*Primary Examiner* — Mark F. Huff
*Assistant Examiner* — Charles Collins Sullivan, IV
(74) *Attorney, Agent, or Firm* — CANON U.S.A., INC. IP DIVISION

(57) ABSTRACT

A developing device including: a developer; and a developing member configured to carry the developer on a surface thereof, the developing roller including an electro-conductive substrate and a single-layer elastic layer serving as a surface layer on the substrate, the surface layer comprising a binder resin, and the binder resin contains a crosslinked urethane resin and a crosslinked acrylic resin, the crosslinked urethane resin and the crosslinked acrylic resin form an interpenetrating polymer network structure in a first region from an outer surface of the surface layer to a position at a depth of 0.1 μm from the outer surface, wherein the developer contains developer particles each containing at least a binder resin and a magnetic substance.

11 Claims, 5 Drawing Sheets

(56) References Cited

U.S. PATENT DOCUMENTS

| | | | | |
|---|---|---|---|---|
| 2015/0248101 | A1* | 9/2015 | Hayashi | G03G 5/14734<br>430/105 |
| 2020/0004170 | A1* | 1/2020 | Ishii | G03G 5/0507 |

FOREIGN PATENT DOCUMENTS

| | | | |
|---|---|---|---|
| JP | H08240925 | A | 9/1996 |
| JP | H11100549 | A | 4/1999 |
| JP | 2001200831 | A | 7/2001 |
| JP | 2006154060 | A | 6/2006 |
| JP | 2014197064 | A | 10/2014 |
| JP | 2015125284 | A | 7/2015 |
| JP | 2019168614 | A | 10/2019 |
| JP | 2020008847 | A | 1/2020 |
| JP | 2020166227 | A | 10/2020 |
| JP | 2020170158 | A | 10/2020 |

* cited by examiner

DEVELOPING DEVICE, PROCESS CARTRIDGE, AND ELECTROPHOTOGRAPHIC IMAGE FORMING APPARATUS

BACKGROUND

Technical Field

The present disclosure relates to a developing device to be incorporated into an apparatus adopting an electrophotographic system. The present disclosure also relates to an electrophotographic process cartridge and an electrophotographic image forming apparatus each including the developing device.

Description of the Related Art

In an electrophotographic image forming apparatus (also referred to as "electrophotographic apparatus"), a developing device includes a developing roller for carrying a developer on its surface, and serves to supply the developer on the developing roller to an electrostatic latent image on an electrophotographic photosensitive member to form a developer image.

In Japanese Patent Application Laid-Open No. 2014-197064, there is a disclosure of an electrophotographic member to be used in an electrophotographic apparatus, the electrophotographic member including, as materials for a site including its surface, a rubber elastic body having rubber elasticity and a surface-treated layer including a cured product of a photocurable composition impregnated from the surface of the rubber elastic body. A modified rubber elastic body, which contains, as the photocurable composition, a (meth)acrylic monomer, a photopolymerizable polymer having a silicone group and/or a fluorine-containing group, and a (meth)acryloyl group in a molecule thereof, and a photopolymerization initiator, has been used. In addition, in Japanese Patent Application Laid-Open No. 2014-197064, there is a description that according to such electrophotographic member, both of developer releasability and a low friction property are achieved.

When the electrophotographic member as described in Japanese Patent Application Laid-Open No. 2014-197064 is subjected to image output under a high-temperature and high-humidity environment together with a developer containing a magnetic substance, so-called fogging in which toner is transferred onto the region of an electrophotographic image onto which the toner is not originally transferred has occurred in some cases.

SUMMARY

At least one aspect of the present disclosure is directed to providing a developing device that can suppress the occurrence of fogging in an electrophotographic image even when the electrophotographic image is formed with a developer containing a magnetic substance under a high-temperature and high-humidity environment.

Another aspect of the present disclosure is directed to providing an electrophotographic process cartridge conducive to stable formation of a high-quality electrophotographic image. Still another aspect of the present disclosure is directed to providing an electrophotographic image forming apparatus that can stably form a high-quality electrophotographic image.

According to one aspect of the present disclosure, there is provided a developing device including: a developer; and a developing member configured to carry the developer on a surface thereof, the developing member including an electro-conductive substrate and a single-layer elastic layer serving as a surface layer on the substrate, the surface layer comprising a binder resin, and the binder resin containing a crosslinked urethane resin and a crosslinked acrylic resin, the crosslinked urethane resin and the crosslinked acrylic resin forming an interpenetrating polymer network structure in a first region from an outer surface of the surface layer to a position at a depth of 0.1 μm from the outer surface of the surface layer, wherein the developer contains developer particles each containing at least a binder resin and a magnetic substance.

In addition, according to another aspect of the present disclosure, there is provided a developing device including: a developer; and a developing member configured to carry the developer on a surface thereof, wherein the developing member includes an electro-conductive substrate and a single-layer elastic layer serving as a surface layer on the substrate, the surface layer comprising a binder resin, and the binder resin containing a crosslinked urethane resin and a crosslinked acrylic resin, wherein a first region from an outer surface of the surface layer to a position at a depth of 0.1 μm from the outer surface of the surface layer contains both of the crosslinked urethane resin and the crosslinked acrylic resin, wherein when sampling a first sample from the first region and a peak top temperature of a thermal chromatogram derived from the crosslinked acrylic resin in the first sample is defined as A1(° C.), and when obtaining a second sample by decomposing the crosslinked urethane resin in the first sample, and a peak top temperature of a thermal chromatogram derived from the crosslinked acrylic resin in the second sample is defined as A2(° C.), A1 and A2 satisfy a relationship represented by the following formula (1): Formula (1) $A1>A2$, and wherein the developer contains developer particles each containing at least a binder resin and a magnetic substance.

In addition, according to another aspect of the present disclosure, there is provided a process cartridge removably mounted onto a main body of an electrophotographic image forming apparatus, the process cartridge including the above-mentioned developing device.

Further, according to another aspect of the present disclosure, there is provided an electrophotographic image forming apparatus including: an image-bearing member for bearing an electrostatic latent image; a charging device for primarily charging the image-bearing member; an exposing device for forming an electrostatic latent image on the image-bearing member that is primarily charged; a developing member for developing the electrostatic latent image with a developer to form a developer image; and a transferring device for transferring the developer image onto a transfer material, wherein a developing device including the developing member is the above-mentioned developing device.

Further features of the present disclosure will become apparent from the following description of exemplary embodiments with reference to the attached drawings.

DESCRIPTION OF THE EMBODIMENTS

Figures 1A, 1B:
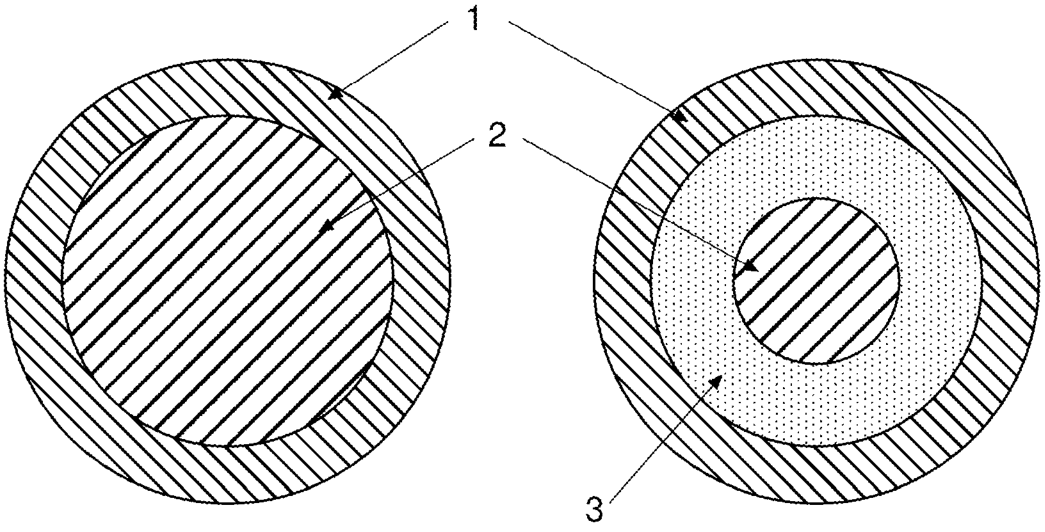
FIG. 1A and FIG. 1B are each a schematic view for illustrating a developing roller according to one aspect of the present disclosure.

The inventors of the present disclosure have made an investigation, and as a result, have found that when a developing member having a specific structure is used in the formation of an electrophotographic image with a developer containing a binder resin and a magnetic substance (hereinafter also referred to as "magnetic developer"), a high-quality electrophotographic image reduced in fogging can be formed even under a high-temperature and high-humidity environment.

That is, a developing device according to one aspect of the present disclosure includes: a developer; and a developing member configured to carry the developer on a surface thereof. The developing member includes an electro-conductive substrate and a single-layer elastic layer serving as a surface layer on the substrate. The surface layer has a binder resin, and the binder resin contains a crosslinked urethane resin and a crosslinked acrylic resin. The crosslinked urethane resin and the crosslinked acrylic resin form an interpenetrating polymer network structure in a first region from an outer surface of the surface layer to a position at a depth of 0.1 μm from the outer surface of the surface layer. In addition, the developer contains developer particles each containing at least a binder resin and a magnetic substance.

A developing device according to another aspect of the present disclosure includes: a developer; and a developing member configured to carry the developer on a surface thereof. The developing member includes an electro-conductive substrate and a single-layer elastic layer serving as a surface layer on the substrate. The surface layer comprises a binder resin, and the binder resin contains a crosslinked urethane resin and a crosslinked acrylic resin. A first region between an outer surface of the surface layer and a position at a depth of 0.1 μm from the outer surface of the surface layer, contains the crosslinked urethane resin and the crosslinked acrylic resin. A peak top temperature of a thermal chromatogram derived from the crosslinked acrylic resin, the thermal chromatogram being measured from a first sample sampled from the first region, is defined as A1 (° C.). In addition, a peak top temperature of a thermal chromatogram derived from the crosslinked acrylic resin, the thermal chromatogram being measured from a second sample obtained by decomposing the crosslinked urethane resin in the first sample, is defined as A2 (° C.). In addition, the A1 and the A2 satisfy a relationship represented by the following formula (1).

$$A1>A2 \qquad \text{Formula (1)}$$

In addition, the developer contains developer particles each containing at least a binder resin and a magnetic substance.

The inventors of the present disclosure have assumed the reason why a high-quality electrophotographic image can be formed even under a high-temperature and high-humidity environment with the developing device having such configuration as described above to be as described below. The action mechanism of the developing device according to one aspect of the present disclosure to be described below is merely one possible assumption, and the present disclosure is not limited thereto. In addition, the following description is given by taking a developing member having a roller shape (hereinafter also referred to as "developing roller") as an example of the developing member, but the developing member according to the present disclosure is not limited to the developing roller.

Figure 5:
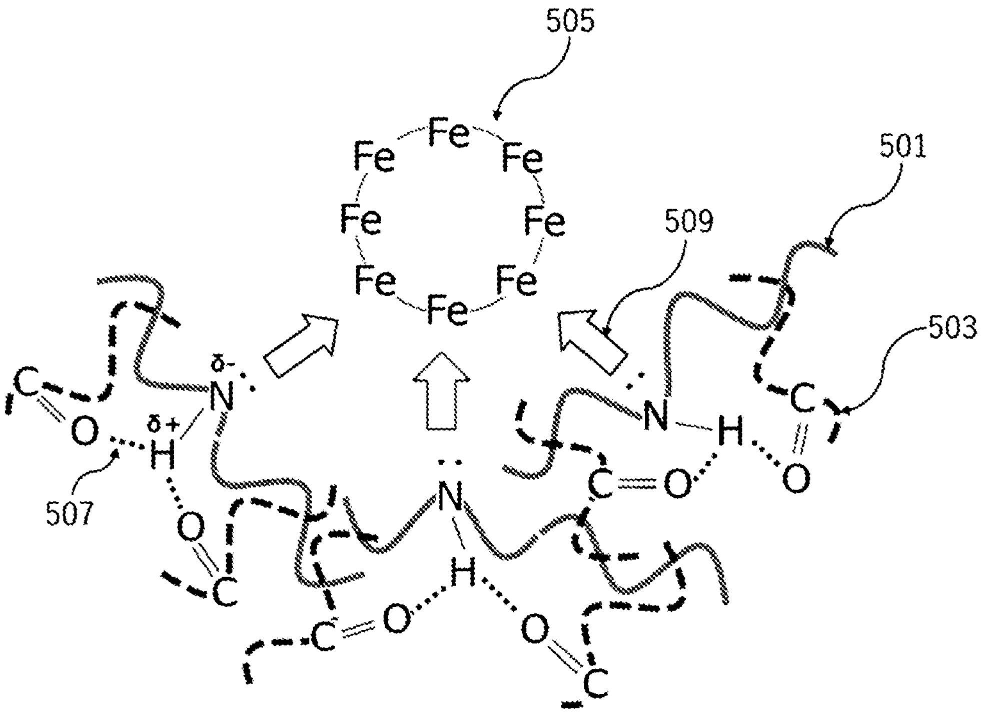
FIG. 5 is an explanatory view of an assumed action mechanism of a developing member according to the present disclosure.

The interpenetrating polymer network structure is formed in the first region from the toner-carrying surface (hereinafter also referred to as "outer surface") of the developing roller according to one aspect of the present disclosure to a depth of 0.1 μm. The interpenetrating polymer network structure is hereinafter also referred to as "IPN structure." The IPN structure is defined as a structure in which the network structures of two or more kinds of polymer compounds are intertwined and entangled with each other without being bonded to each other through a covalent bond. The IPN structure is not loosened unless the molecular chains of the polymer compounds for forming its network are cleaved. In the IPN structure in the surface layer according to the present disclosure, as schematically illustrated in FIG. 5, a crosslinked acrylic resin 503 is mutually intertwined with the network of the three-dimensional crosslinked structure of a crosslinked urethane resin 501.

It is the electron cloud (not shown) of the highest occupied molecular orbital (also referred to as "HOMO") present on a nitrogen atom in a urethane bond of the crosslinked urethane resin that serves to impart charge to a developer particle 505 in such IPN structure.

Meanwhile, the nitrogen atom in the urethane bond (hereinafter also referred to as "urethane nitrogen") is bonded to a hydrogen atom (hereinafter also referred to as "urethane hydrogen"). The bonding electron of the hydrogen atom bonded to the nitrogen atom having a high electronegativity is attracted toward the nitrogen atom. In such case, the nitrogen atom attracting the bonding electron has slightly negative charge (δ−), and the hydrogen atom whose bonding electron is attracted has slightly positive charge (δ+) Such hydrogen atom is also referred to as "active hydrogen."

Herein, in the IPN structure according to the present disclosure, a urethane bond in the crosslinked urethane resin 501 and a carbonyl bond in the crosslinked acrylic resin 503 may be present at positions extremely close to each other.

In addition, when a molecule having a carbonyl bond is present near the urethane hydrogen having slightly positive charge, the urethane hydrogen forms an intermolecular hydrogen bond (507) with an oxygen atom in the carbonyl bond (also referred to as "carbonyl oxygen"). In this case, the urethane hydrogen is attracted to the carbonyl oxygen, and hence the urethane nitrogen having bonded thereto the urethane hydrogen can further attract the bonding electron toward itself. Probably as a result of the foregoing, the electron density of the electron cloud on the nitrogen atom increases to largely improve the ability thereof to impart charge to the developer.

Further, the magnetic developer according to the present disclosure contains the magnetic substance. A metal atom is incorporated into the magnetic substance. Examples of a magnetic material to be suitably used in the developer include the following materials: iron-based metal oxides, such as magnetite, maghemite, and ferrite; and magnetic metals, such as Fe, Co, and Ni.

Each of those magnetic materials also functions as a Lewis acid, and can afford to accept an electron in its lowest unoccupied molecular orbital (also referred to as "LUMO"). When a Lewis base having an electron-donating ability approaches the Lewis acid, charge exchange may be smoothly performed by a Lewis acid-base interaction.

In the present disclosure, the electron density of the urethane nitrogen functioning as a Lewis base is increased by the above-mentioned reason, and hence charge may be more efficiently imparted to the magnetic metal atom in the developer (see reference numeral 509 of FIG. 5). Thus, sufficient charge is imparted to the developer even under a high-temperature and high-humidity environment where the developer is hardly triboelectrically charged. Probably as a result of the foregoing, the occurrence of fogging in an electrophotographic image under the high-temperature and high-humidity environment can be effectively prevented.

Incidentally, the prevention of the leakage of the charge obtained by the developer to the developing member through an increase in volume resistivity of the surface layer is effective in alleviating fogging. That is, the charge leakage from the developer in contact with the outer surface of the developing member is caused by the escape of the charge from the surface layer of the developing roller toward the elastic layer and the substrate. To suppress such charge leakage, the volume resistivity of the binder resin in the surface layer of the developing member preferably falls within the following range in which the resin shows an insulating property: the volume resistivity is preferably $1.0\times10^{10}$ Ω·cm or more and $1.0\times10^{18}$ Ω·cm or less, more preferably $1.0\times10^{13}$ Ω·cm or more and $1.0\times10^{16}$ Ω·cm or less. Thus, the charge efficiently imparted to the developer by the surface layer having the IPN structure can be more reliably held in the developer. Examples of the crosslinked urethane resin providing such volume resistivity include a polyether-modified urethane resin, a polyester-modified urethane resin, and a polycarbonate-modified urethane resin. Of those, a polycarbonate-modified urethane resin may be suitably used because the resin may have a higher volume resistivity. An example of the polycarbonate-modified urethane resin may be a urethane resin including a chemical structure represented by the following structural formula (1) between two adjacent urethane bonds.

Structural formula (1)

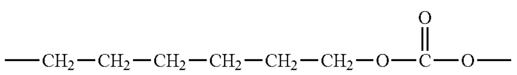

In addition, a urethane resin having, in its soft segment, an alkyl group such as a methyl group serving as a side chain is preferably used. That is, the side chain inhibits the crystallization of the soft segment moiety, and hence can suppress a rise in conductivity of the surface layer due to the development of the crystal structure. Accordingly, the resin may serve as a binder resin conducive to the formation of a surface layer having a higher volume resistivity. A urethane resin having, in its soft segment moiety, such a structure having a side-chain methyl group as represented by the following structural formula (2) between two adjacent urethane bonds may be given as an example.

Structural formula (2)

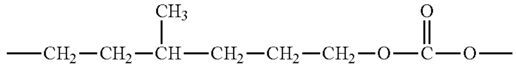

<<Developing Roller>>

The developing roller according to one aspect of the present disclosure is described in detail below with reference to the drawings.

As illustrated in FIG. 1A and FIG. 1B, the developing roller according to one aspect of the present disclosure includes an electro-conductive substrate 2 and a single-layer elastic layer serving as a surface layer 1 on the substrate. The surface layer 1 may be arranged directly on the conductive substrate as illustrated in FIG. 1A, or a developing roller in which one or a plurality of intermediate layers 3 are further arranged as required between the substrate 2 and the surface layer 1 as illustrated in FIG. 1B may be used.

<Surface Layer>

To achieve the aspect of the present disclosure, the following needs to be performed: the crosslinked urethane resin and the crosslinked acrylic resin are arranged in the outermost surface of the developing roller; and such a spatial environment that the resins affect each other is established. To this end, it is effective to form the interpenetrating polymer network (IPN) structure of the crosslinked urethane resin and the crosslinked acrylic resin in the first region from the surface of the surface layer to a position at a depth of 0.1 μm from the outer surface of the surface layer.

[Method of Recognizing IPN Structure]

The presence of the IPN structure in the surface layer (elastic layer) may be recognized by, for example, the shift of the glass transition point (Tg) of a polymer for forming the IPN structure.

That is, a peak top temperature in a thermal chromatogram corresponding to the thermal decomposition temperature of the crosslinked acrylic resin may shift to higher temperatures in the IPN structure as compared to the case where the resin is present alone.

Accordingly, the formation of the IPN structure by both of the crosslinked urethane resin and the crosslinked acrylic resin may be recognized by the fact that when the peak top temperatures of the thermal chromatograms of the crosslinked acrylic resin before and after the decomposition of the crosslinked urethane resin in the surface layer are compared to each other, the peak top temperature after the decomposition is lower than that before the decomposition. Herein, the thermal chromatograms are each a mass spectrum that may be obtained by microsampling thermal decomposition mass spectrometry.

The outline of the microsampling thermal decomposition mass spectrometry is described below.

Figure 4:
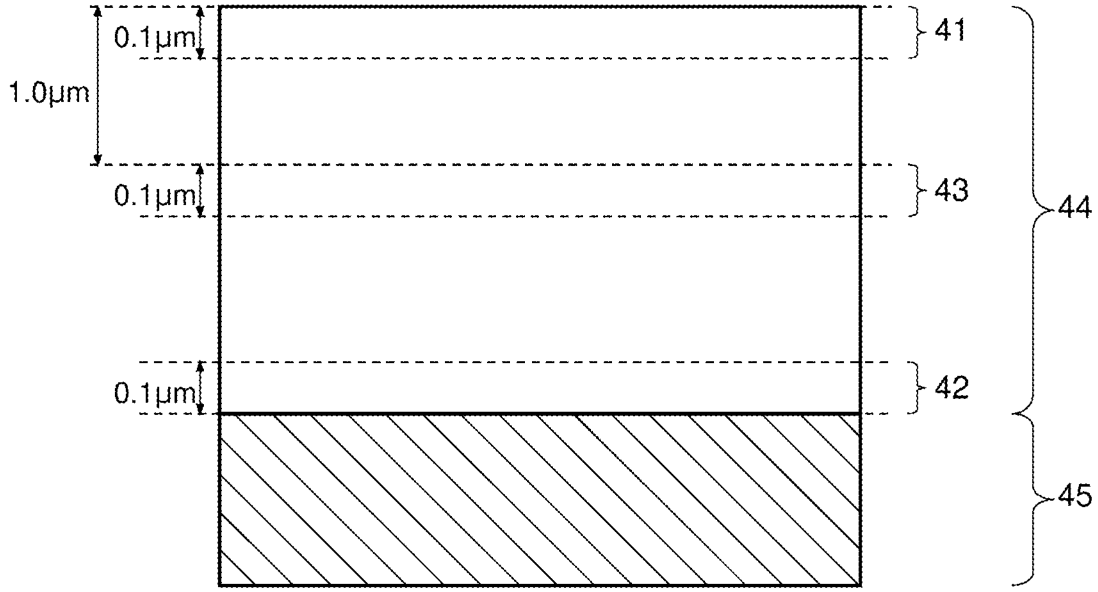
FIG. 4 is a sectional view of the surface layer of the developing roller according to one aspect of the present disclosure.

First, a region of an electrophotographic member to be subjected to measurement is cut out into a flake with a microtome to prepare a sample. In this aspect, as illustrated in FIG. 4, the samples are prepared from three regions called a first region 41, a second region 42, and a third region 43. The first region 41 is a region from the outer surface of a surface layer 44 to a depth of 0.1 μm, the second region 42 is a region having a thickness of 0.1 μm from the rear surface of the surface layer 44 (surface facing an electro-conductive substrate 45) toward the outer surface, and the third region 43 is a region corresponding to a depth of 1.0 μm or more and 1.1 μm or less from the outer surface.

A 100-micrometer square flake having a thickness of 0.1 μm is produced from each of the regions of the surface layer. For example, an ion trap-type mass spectrometer mounted on a gas chromatography mass spectrometer ("Polaris Q" (product name, manufactured by Thermo Electron Corporation)) is used in the measurement. The sample is fixed to a filament positioned at the tip of the probe of the ion trap-type mass spectrometer, and is directly inserted into the ionization chamber of the gas chromatography mass spectrometer. After that, the sample is rapidly heated from room temperature to a temperature of 1,000° C. at a constant heating rate. The sample that has been decomposed and evaporated by the heating is ionized by being irradiated with an electron beam, and is detected with the mass spectrometer. At this time, under such a condition that the heating rate is constant, a thermal chromatogram similar to a thermogravimetry-mass spectrometry (TG-MS) method, the chromatogram having a mass spectrum called a total ion chromatogram (TIC), is obtained. In addition, a thermal chromatogram for a fragment having a predetermined mass can also be obtained, and hence the peak temperature of the thermal chromatogram corresponding to the decomposition temperature of a desired molecular structure can be obtained. The peak temperature of the thermal chromatogram correlates with a crosslinked structure in the structural body of a resin, and hence the peak temperature shifts to higher temperatures as the crosslinkage of the crosslinked structure becomes denser.

The fact that the crosslinked acrylic resin forms the IPN structure with the crosslinked urethane resin may be recognized as described below. That is, a difference between the peak temperatures of the thermal chromatograms of a fragment derived from the crosslinked acrylic resin before and after the decomposition and removal of the crosslinked urethane resin in the composition of the electrophotographic member only needs to be recognized.

Herein, the peak top temperature of the thermal chromatogram derived from the crosslinked acrylic resin, the thermal chromatogram being measured from the first sample sampled from the first region, is represented by A1 (° C.). In addition, the peak top temperature of the thermal chromatogram derived from the crosslinked acrylic resin, the thermal chromatogram being measured from the second sample obtained by decomposing the crosslinked urethane resin in the first sample, is represented by A2 (° C.). When the IPN structure is formed, the A1 and the A2 satisfy the relationship represented by the following formula (1):

$$A1>A2. \qquad \text{Formula (1)}$$

Examples of a method of forming the IPN structure include the following method (i) and method (ii):

(i) a method including forming the network structure of the polymer of a first component in advance, then swelling the polymer of the first component with the monomer of a second component and a polymerization initiator, and forming the network structure of the polymer of the second component after the swelling (the method is also referred to as "sequential network formation method"); and (ii) a method including mixing the monomer of the first component and the monomer of the second component having reaction mechanisms different from each other, and polymerization initiators for the respective monomers to simultaneously form the network structures (the method is also referred to as "simultaneous network formation method").

A method of producing the surface layer (elastic layer) according to this aspect having the IPN structure in the first region is described later.

[Crosslinked Urethane Resin]

The crosslinked urethane resin is obtained by causing a polyol having a hydroxy group and an isocyanate compound to react with each other to form a urethane group. The term "crosslinked" as used herein means that one compound, or each of both compounds, selected from the group consisting of the polyol and the isocyanate compound that are urethane resin raw materials has three or more reactive functional groups, and hence the crosslinked urethane resin has a three-dimensional network structure. Such crosslinked urethane resin has excellent flexibility and high strength.

The urethane resin may be obtained from the polyol and the isocyanate compound, and a chain extender as required. Examples of the polyol that is a urethane resin raw material include a polyether polyol, a polyester polyol, a polycarbonate polyol, a polyolefin polyol, an acrylic polyol, and mixtures thereof. Of those, a polyol that can provide a chemical structure represented by the structural formula (1) or (2) is preferably used. For example, a polyether polyol having a side-chain methyl group or a polycarbonate polyol having a side-chain methyl group may be suitably used.

Examples of the isocyanate compound that is a urethane resin raw material include the following isocyanate compounds: tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethyl xylylene diisocyanate (TMXDI), cyclohexane diisocyanate, and mixtures thereof.

Examples of the chain extender that is an optional component include: bifunctional low-molecular-weight diols, such as ethylene glycol, 1,4-butanediol, and 3-methylpentanediol; trifunctional low-molecular-weight triols such as trimethylolpropane; and mixtures thereof. In addition, prepolymer-type isocyanate compounds each having an isocyanate group at a terminal thereof, the compounds being obtained by causing the various isocyanate compounds and the various polyols described above to react with each other in advance under a state in which an isocyanate group is excessive with respect to a hydroxy group, may be used. In addition, materials obtained by blocking isocyanate groups with various blocking agents such as methyl ethyl ketone (MEK) oxime may be used as those isocyanate compounds.

No matter what material is used, the urethane resin can be obtained by causing the polyol and the isocyanate compound to react with each other through heating. When one, or each of both, of the polyol and the isocyanate compound preferably has a branched structure and three or more functional groups, the urethane resin to be obtained becomes the crosslinked urethane resin.

[Crosslinked Acrylic Resin]

The crosslinked acrylic resin forms the IPN structure together with the crosslinked urethane resin to bring a significant improving effect on the ability of the surface layer of the developing member to impart charge to the magnetic developer through the above-mentioned action mechanism.

The crosslinked acrylic resin is formed by the polymerization of an acrylic monomer. The term "acrylic monomer" as used herein means not only an acrylic monomer but also a methacrylic monomer. That is, the crosslinked acrylic resin is formed by the polymerization of one or both of the acrylic monomer and the methacrylic monomer.

As described above, the IPN structure of the crosslinked acrylic resin and the crosslinked urethane resin is formed by impregnating a liquid acrylic monomer into a resin layer containing the crosslinked urethane resin and curing the impregnated product. The kind of the acrylic monomer to be used herein includes a polyfunctional monomer having a plurality of acryloyl groups or methacryloyl groups as functional groups for forming a crosslinked structure. Meanwhile, when the number of functional groups is four or more, the viscosity of the acrylic monomer becomes remarkably high. Accordingly, the monomer hardly infiltrates the surface of the resin layer formed of the crosslinked urethane resin, and as a result, the IPN structure is hardly formed. Accordingly, such a monomer that the total number of an acryloyl group and a methacryloyl group present in a molecule is two or three is preferred as the acrylic monomer, and a bifunctional acrylic monomer having two such groups is given as a more preferred example thereof.

The molecular weight of the acrylic monomer preferably falls within the range of from 200 or more to 750 or less. When the acrylic monomer having a molecular weight within the range is used, the IPN structure is easily formed for the network structure of the crosslinked urethane resin, and hence the strength of the surface layer can be effectively improved.

As described above, the acrylic monomer is impregnated into the resin layer containing the crosslinked urethane resin. To that end, the monomer needs to have an appropriate viscosity. That is, when the monomer has a high viscosity, the monomer is hardly impregnated, and when the monomer has a low viscosity, its impregnated state is difficult to control. Accordingly, the viscosity of the acrylic monomer is preferably 5.0 mPa·s or more and 140 mPa·s or less at 25° C.

That is, the IPN structure of the crosslinked urethane resin and the crosslinked acrylic resin may be formed by: selecting one or two or more kinds of acrylic monomers each satisfying the above-mentioned molecular weight range and viscosity range; impregnating the selected monomers into the resin layer; and polymerizing the monomers.

A method of polymerizing the acrylic monomer is not particularly limited, and a known method may be used. Specific examples thereof include thermal polymerization based on heating and photopolymerization based on UV irradiation.

A known radical polymerization initiator or ionic polymerization initiator may be used for each of the polymerization methods.

A thermal polymerization initiator when the thermal polymerization is performed is, for example: a peroxide, such as 3-hydroxy-1,1-dimethylbutyl peroxyneodecanoate, α-cumyl peroxyneodecanoate, t-butyl peroxyneoheptanoate, t-butyl peroxypivalate, t-amylperoxy n-octoate, t-butylperoxy 2-ethylhexyl carbonate, dicumyl peroxide, di-t-butyl peroxide, di-t-amyl peroxide, 1,1-di(t-butylperoxy)cyclohexane, or n-butyl-4,4-di(t-butylperoxy)valerate; or an azo compound, such as 2,2-azobisisobutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl)propane], 2,2-azobis[2-methyl-N-(2-hydroxyethyl)propionamide], 2,2-azobis[N-(2-propenyl)-2-methylpropionamide], 2,2-azobis(N-butyl-2-methoxypropionamide), or dimethyl-2,2-azobis (isobutyrate).

A photopolymerization initiator when the photopolymerization based on UV irradiation is performed is, for example, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, or 2,4,6-trimethylbenzoyl-diphenylphosphine oxide.

Those polymerization initiators may be used alone or in combination thereof.

In addition, with regard to the blending amount of the polymerization initiator, when the total amount of a compound for forming a specific resin (e.g., a compound having a (meth)acryloyl group) is defined as 100 parts by mass, the initiator is preferably used in an amount of 0.5 part by mass or more and 10 parts by mass or less from the viewpoint of efficiently advancing a reaction for the formation of the resin. A known device may be appropriately used as a device for heating or a device for UV irradiation. For example, an LED lamp, a high-pressure mercury lamp, a metal halide lamp, a xenon lamp, and a low-pressure mercury lamp may each be used as a light source for applying UV light. An integrated light quantity required at the time of the polymerization may be appropriately adjusted in accordance with the kinds and addition amounts of the compound and the polymerization initiator to be used.

[Function of Surface Layer]

The surface layer is preferably soft for relaxing a mechanical stress to be applied to the developer carried on its outer surface. Meanwhile, an IPN structure brings an increase in hardness of the surface layer. Accordingly, it is preferred that the side of the surface layer facing the substrate be free of any IPN structure, or even when the side has an IPN structure, the IPN structure be such that the extent to which the crosslinked acrylic resin enters the crosslinked urethane resin is relatively weak as compared to the IPN structure of the first region. Thus, even when the outer surface side of the surface layer has a developed IPN structure, an increase in hardness as the surface layer can be suppressed.

Specifically, when a region having a thickness of 0.1 μm from the surface of the surface layer on a side facing the substrate toward the outer surface is defined as a second region, the first region and the second region preferably satisfy a relationship represented by the following formula (2), and particularly preferably satisfy a relationship represented by the formula (3). Herein, T1 (° C.) represents the peak top temperature of a thermal chromatogram derived from the crosslinked urethane resin, the thermal chromatogram being measured from a sample sampled from the first region, and T2 (° C.) represents the peak top temperature of a thermal chromatogram derived from the crosslinked urethane resin, the thermal chromatogram being measured from a sample sampled from the second region.

$$T1>T2 \qquad \text{Formula (2)}$$

$$(T1-T2)>1.0(° \text{C.}) \qquad \text{Formula (3)}$$

In addition, to more satisfactorily exhibit the function of relaxing the mechanical stress to be applied to the developer of the surface layer, the thickness of the surface layer is preferably 2.0 μm or more and 150.0 μm or less. In addition, in the surface layer having such thickness, when a region having a thickness of 0.1 μm from a depth of 1.0 μm from the outer surface of the surface layer to a depth of 1.1 μm therefrom is defined as a third region, it is preferred that no IPN structure be present in the third region adjacent to the first region. Alternatively, even when an IPN structure is present, the IPN structure is preferably such that the extent to which the crosslinked acrylic resin enters the crosslinked urethane resin is weak as compared to the IPN structure in the first region.

Accordingly, when the peak top temperature of a thermal chromatogram derived from the crosslinked urethane resin, the thermal chromatogram being measured from a sample sampled from the third region, is represented by T3 (° C.), the T1, the T2, and the T3 preferably satisfy relationships represented by the formula (4) and the formula (5).

$$T1>T3 \quad \text{Formula (4)}$$

$$|T1-T3|>|T3-T2| \quad \text{Formula (5)}$$

[Volume Resistivity of Binder Resin of Surface Layer and Measurement Method Therefor]

As described above, the volume resistivity of the binder resin in the surface layer is set to preferably $1.0\times10^{10}$ Ω·cm or more and $1.0\times10^{18}$ Ω·cm or less, particularly preferably $1.0\times10^{13}$ Ω·cm or more and $1.0\times10^{16}$ Ω·cm or less. Thus, charge attenuation due to the leakage of the charge of the developer (referred to as "developer charge") to the developing member can be more reliably prevented. In addition, excessive charging of the developer can be suppressed.

In the measurement of the volume resistivity of the binder resin, a measured value measured with an atomic force microscope (AFM) by an electro-conductive mode may be adopted. A sample piece is cut out of the resin binder portion of the surface layer of the developing roller with a manipulator, and one surface of the sample piece is subjected to metal deposition. A DC power source is connected to the surface subjected to the metal deposition, and a voltage is applied thereto. The free end of a cantilever is brought into contact with the surface of the sample piece opposite to the surface subjected to the metal deposition, and a current image is obtained through the main body of the AFM. The volume resistivity may be calculated from the current value thus obtained, the thickness of the sample piece, and the area of contact of the cantilever.

Other Component

In addition to the above-mentioned components, a component, such as a crosslinking agent, a plasticizer, a filler, an extender, a vulcanizing agent, a vulcanization aid, a crosslinking aid, an antioxidant, an age inhibitor, a processing aid, or a leveling agent, may be incorporated into the surface layer to the extent that the function of the surface layer is not inhibited. In addition, when the surface layer needs to have a surface roughness, fine particles for imparting roughness may be incorporated into the surface layer. Specifically, the fine particles of a polyurethane resin, a polyester resin, a polyether resin, a polyamide resin, an acrylic resin, or a polycarbonate resin may be used. The volume-average particle diameter of the fine particles is preferably 1.0 μm or more and 30 μm or less, and a surface roughness (ten-point average roughness) Rzjis formed by the fine particles is preferably 0.1 μm or more and 20 μm or less. The Rzjis is a value measured based on JIS B 0601 (1994).

[Additive]

It is preferred that one kind or a plurality of kinds of additives selected from a modified silicone compound and a modified fluorine compound be incorporated into the above-mentioned surface layer because the acrylic monomer remains near the outer surface of the surface layer, and hence the IPN structure can be locally formed extremely near the outer surface. The incorporation of the additive can suppress the permeation of the acrylic monomer deep into the surface layer, and hence can hold a suitable property by which charge is imparted to the developer of the surface layer. Accordingly, a fogging phenomenon can be suppressed at a higher dimension.

[Method of Producing Surface Layer]

When the surface layer of this embodiment is produced by the sequential network formation method, the method includes the following steps: a step of impregnating the crosslinked urethane resin serving as the binder resin onto the conductive substrate, followed by the impregnation of the liquid acrylic monomer into the outer surface of the resin layer; and a step of curing the impregnated acrylic monomer. The surface layer according to this embodiment can be formed through the respective steps.

Although a method of forming the resin layer is not particularly limited, a coating molding method including using a liquid coating material is preferred. The resin layer may be formed by, for example, dispersing and mixing the respective materials for the resin layer in a solvent to prepare a coating material, applying the coating material onto the conductive substrate, and drying the applied coating material to solidify the coating material or heating the coating material to cure the coating material.

The solvent is preferably a polar solvent from the viewpoint of its compatibility with the polyol or the isocyanate compound that is a crosslinked urethane raw material. For example, one kind or two or more kinds of the following solvents well compatible with another material may be mixed and used: alcohols, such as methanol, ethanol, and n-propanol; ketones, such as acetone, methyl ethyl ketone, and methyl isobutyl ketone; and esters, such as methyl acetate and ethyl acetate.

In addition, a solid content at the time of the preparation of the coating material, which may be freely adjusted by the mixing amount of the solvent, is preferably adjusted to 20 mass % or more and 40 mass % or less from the viewpoint of uniformly dispersing carbon black. A known dispersing device utilizing beads, such as a sand mill, a paint shaker, a dinomill, or a pearl mill, may be utilized for the dispersion and the mixing. In addition, dip coating, ring coating, spray coating, or roll coating may be utilized as a method for the application.

Although the temperature at which the coating material is dried to be solidified or is heated to be cured is not particularly limited as long as the crosslinking of the urethane resin advances, the temperature is preferably 50° C. or more, more preferably 70° C. or more.

Next, the liquid acrylic monomer is impregnated into the resin layer formed as described above.

When the liquid acrylic monomer is impregnated as an impregnation treatment liquid appropriately diluted with any one of various solvents, a surface layer having more uniform surface composition can be formed.

A solvent that satisfies both of an affinity for the resin layer and solubility for the acrylic monomer may be freely selected as the solvent. Examples thereof include: alcohols, such as methanol, ethanol, and n-propanol; ketones, such as acetone, methyl ethyl ketone, and methyl isobutyl ketone; and esters, such as methyl acetate and ethyl acetate. In addition, the impregnation treatment liquid may be appropriately mixed with a polymerization initiator. Details about the polymerization initiator are described later. Although a method of impregnating the impregnation treatment liquid is not particularly limited, dip coating, ring coating, spray coating, or roll coating may be utilized.

The surface layer may be formed by performing impregnation treatment with the impregnation treatment liquid as described above, and then polymerizing and curing the acrylic monomer. A method for the polymerization and the curing is not particularly limited, and a known method may be used. Specific examples thereof include methods, such as heat curing and UV irradiation.

Through such steps, the crosslinked acrylic resin is introduced in such a form as to be mutually entangled with the network structure of the crosslinked urethane resin of the resin layer, and hence the IPN structure can be formed. The thickness of the surface layer thus obtained is preferably 2.0 μm or more and 150.0 μm or less from the viewpoints of its film strength and flexibility.

<Substrate>

A columnar or cylindrical conductive substrate may be used as the conductive substrate 2. The surface of the substrate may be subjected to known surface treatment for the purpose of improving its adhesive property with the intermediate layer or the surface layer to be arranged on its outer periphery. Alternatively, an adhesive layer may be arranged thereon. With regard to a material for the substrate, the substrate may include such an electro-conductive material as described below:

a metal or an alloy, such as aluminum, a copper alloy, or stainless steel;

iron subjected to plating treatment with chromium or nickel; or a synthetic resin having conductivity.

<Intermediate Layer>

The intermediate layer 3 is preferably formed of a molded body of a rubber material. Examples of the rubber material include an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydrogenated NBR, and a urethane rubber. Those rubbers may be used alone or in combination thereof. Of those, a silicone rubber is particularly preferred because the rubber hardly causes a permanent compression set in an electro-conductive intermediate layer even when any other member (e.g., a developer-regulating member) is brought into abutment with the layer over a long time period. A specific example of the silicone rubber is a cured product of an addition-curable liquid silicone rubber.

The intermediate layer may be turned into an electro-conductive intermediate layer by blending the rubber material with a conductivity-imparting agent, such as an electron conductive substance or an ion conductive substance. The volume resistivity of the conductive intermediate layer is adjusted to preferably $10^3$ Ω·cm or more and $10^{11}$ Ω·cm or less, more preferably $10^4$ Ω·cm or more and $10^{10}$ Ω·cm or less.

Examples of the electron conductive substance include the following substances: conductive carbon blacks, such as conductive carbons, carbons for rubber, and carbons for color (ink); and metals and metal oxides thereof. Specific examples thereof include: high-conductive carbons, such as ketjen black EC and acetylene black; carbons for rubber, such as SAF, ISAF, HAF, FEF, GPF, SRF, FT, and MT; carbons for color (ink) each obtained by subjecting carbon black powder to oxidation treatment; and metals, such as copper, silver, and germanium, and metal oxides thereof. Of those, conductive carbon blacks [conductive carbons, carbons for rubber, and carbons for color (ink)] are preferred because the conductivity can be easily controlled with a small amount thereof.

Examples of the ion conductive substance include the following substances: inorganic ion conductive substances, such as sodium perchlorate, lithium perchlorate, calcium perchlorate, and lithium chloride; and organic ion conductive substances, such as a modified aliphatic dimethylammonium ethosulfate and stearylammonium acetate.

Each of those conductivity-imparting agents, which is used in an amount required to adjust the volume resistivity of the intermediate layer to such an appropriate value as described above, is used in an amount in the range of from 0.5 part by mass or more to 50 parts by mass or less with respect to 100 parts by mass of the rubber material for forming the intermediate layer.

In addition, the intermediate layer may further contain, as required, various additives, such as a plasticizer, a filler, an extender, a vulcanizing agent, a vulcanization aid, a crosslinking aid, a curing inhibitor, an antioxidant, an age inhibitor, and a processing aid. Examples of the filler include silica, quartz powder, and calcium carbonate. Those optional components are each blended in an amount in such a range that the function of the intermediate layer is not inhibited.

The intermediate layer preferably has elasticity required for the developing member and an Asker C hardness of 20° or more and 100° or less, and its thickness is preferably 0.3 mm or more and 6.0 mm or less.

The respective materials for the intermediate layer may be mixed with a dynamic mixing device, such as a uniaxial continuous kneader, a biaxial continuous kneader, a twin roll, a kneader mixer, or a trimix, or a static mixing device such as a static mixer.

A method of forming the intermediate layer on the substrate is not particularly limited, and examples thereof may include a mold molding method, an extrusion molding method, an injection molding method, and a coating molding method. An example of the mold molding method may be a method including: first, fixing, to both the ends of a cylindrical mold, dies for holding a mandrel in the mold; forming injection ports in the dies; then arranging the mandrel in the mold; injecting the materials for the intermediate layer from the injection ports; heating the mold after the injection at the temperature at which the materials cure; and removing the cured product from the mold.

An example of the extrusion molding method may be a method including: coextruding the mandrel and the materials for the intermediate layer with a crosshead-type extruder; and curing the materials to form the intermediate layer on the periphery of the mandrel.

The surface of the intermediate layer may be modified by a surface modification method, such as surface polishing, corona treatment, frame treatment, or excimer treatment, for improving its adhesiveness with the surface layer.

<<Developer>>

The developer according to the present disclosure contains the developer particles each containing at least the binder resin and the magnetic substance. A pulverization method or a polymerization method may be used as a method of producing the developer. When the developer is produced by the pulverization method, a known method is used. The developer according to the present disclosure may be obtained by: sufficiently mixing components required for the developer, such as the binder resin and the magnetic substance, and as required, an additive, such as a release agent or a charge control agent, and any other component with a mixer, such as a Henschel mixer or a ball mill; then melting and kneading the mixture with a heat kneader, such as a heating roll, a kneader, or an extruder; cooling the kneaded product to solidify the product; pulverizing the solidified product; then classifying the pulverized product; and subjecting the classified product to surface treatment as required. It does not matter which one of the classification and the surface treatment is performed first. In the classification step, a multidivision classifier is preferably used for an improvement in production efficiency. The pulverization step may be performed by a method including using a known pulverizing device, such as a mechanical impact- or jet-type pulverizing device.

In addition, as a method of directly producing a spherical developer, there is used a method including: suspending a mixture containing, as a main component, a monomer serving as the binder resin of the developer in water; and polymerizing the monomer to provide the developer. The developer according to this aspect is obtained as described below. The magnetic substance serving as an essential component, and a polymerizable monomer, a colorant, and a polymerization initiator serving as other components to be generally used, and as required, a crosslinking agent, a charge control agent, a release agent, and any other additive are uniformly dissolved or dispersed to provide a monomer composition. After that, the monomer composition is dispersed in a continuous phase containing a dispersion stabilizer such as an aqueous phase with an appropriate stirring machine so as to have a moderate particle diameter, and the dispersion liquid is subjected to a polymerization reaction. Thus, a developer having a desired particle diameter can be obtained.

The spherical developer is preferably such a high-sphericity developer that an average circularity in developer particles each having a circle-equivalent diameter measured with a flow-type particle image-measuring device of 3 μm or more and 400 μm or less is 0.970 or more. This is because when the average circularity is set to be high as described above, uniform triboelectric charging of the surfaces of the individual developer particles is facilitated, and hence the developer is excellent in charging uniformity.

In addition, to faithfully develop a finer latent image dot in correspondence with higher image quality, the weight-average particle diameter of the developer is preferably 3 μm or more and 10 μm or less. When the weight-average particle diameter is 3 μm or more, the suppression of a reduction in transfer efficiency, the suppression of an increase in amount of a transfer residual developer on a photosensitive member, the suppression of the shaving of the photosensitive member in a contact charging step, and the suppression of the melt adhesion of the developer can be achieved. Further, the suppression of an increase in surface area of the entirety of the developer, the suppression of reductions in flowability and stirring property of the developer as powder, and the securement of uniform charging of the individual developer particles are facilitated. Accordingly, the suppression of fogging and the deterioration of the transferability of the developer, and the securement of the uniformity of an image are facilitated. In addition, when the weight-average particle diameter of the developer is 10 μm or less, the scattering of a letter or line image can be suppressed, and hence a high resolution is obtained.

A charge control agent may be incorporated (internally added) into the developer, or may be used by being mixed with (externally added to) the developer for the purpose of improving the triboelectric charging characteristic of the developer. This is because the charge control agent enables optimum charge quantity control in accordance with a developing system. Examples of the positive charge control agent include: products modified with nigrosine, a triaminotriphenylmethane-based dye, and a fatty acid metal salt; and quaternary ammonium salts, such as a tributylbenzylammonium-1-hydroxy-4-naphthosulfonic acid salt and tetrabutylammonium tetrafluoroborate. Those positive charge control agents may be used alone or in combination thereof. In addition, as the negative charge control agent, an organic metal compound or a chelate compound is effective. Examples thereof include aluminum acetylacetonate, iron (II) acetylacetonate, and chromium 3,5-di-tert-butylsalicylate. Of those, an acetylacetone metal complex, a monoazo metal complex, and a naphthoic acid-based or salicyclic acid-based metal complex or salt are particularly preferred.

Examples of a magnetic material for the magnetic substance in the developer include: iron-based metal oxides, such as magnetite, maghemite, and ferrite; magnetic metals, such as Fe, Co, and Ni; and alloys of each of those metals and a metal, such as Al, Co, Cu, Pb, Mg, Ni, Sn, Zn, Sb, Be, Bi, Cd, Ca, Mn, Se, Ti, W, or V; and mixtures thereof.

A release agent is preferably blended into the developer. Examples of the release agent include: aliphatic hydrocarbon-based waxes, such as a low-molecular-weight polyethylene, a low-molecular-weight polypropylene, a microcrystalline wax, and a paraffin wax; and waxes each containing a fatty acid ester as a main component, such as a carnauba wax, a Fischer-Tropsch wax, a sasol wax, and a montan wax. Of those, a wax having a low melting point is preferably used from the viewpoint of fixability.

Further, inorganic fine powder, such as silica, titanium oxide, or alumina, is preferably externally added to the developer, that is, caused to be present near the surface of the developer for improving the environmental stability, triboelectric charging stability, developability, flowability, and storage stability of the developer, and improving the cleaning property thereof. The addition amount of the inorganic fine powder is from 0.1 mass % to 5.0 mass % in the developer. In addition, various external additives may be used in combination. An external additive except the inorganic fine powder may be further added and used. Examples of the external additive except the inorganic fine powder include: lubricants, such as polytetrafluoroethylene, zinc stearate, and polyvinylidene fluoride; and abrasives, such as cerium oxide, strontium titanate, and strontium silicate. Of the lubricants, polyvinylidene fluoride is preferred.

<<Developing Device>>

The developing device according to the present disclosure is applicable to any one of conventionally known developing devices as long as the developing device is a combination of the developing roller and developer according to the present disclosure.

Figure 2:
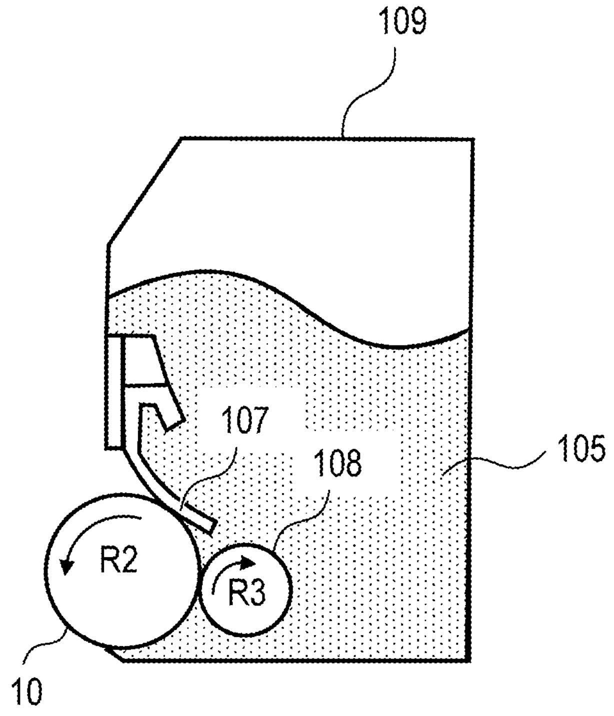
FIG. 2 is a schematic view of a developing device according to one aspect of the present disclosure.

For example, the developing device includes a developer container 109 in which a developer 105 is stored and a developing roller 10 arranged in the opening portion of the developer container for conveying the developer to the outside of the developer container as illustrated in FIG. 2. In addition, the developing device includes a developing blade 107 that is a developer-regulating member, and a developer-supplying roller 108 on the upstream side of the rotation of the developing roller 10, the developer-supplying roller being brought into abutment with the developing roller 10 under a rotatable state. In addition, the developing device has arranged therein an end portion-sealing member (not shown) arranged in the end portion of the opening portion of the developer container 109, the member being brought into abutment with the developing roller 10. The end portion-sealing member includes a member, such as sponge or felt, in accordance with the shape of the opening portion of the developer container formed in correspondence with the shapes of both the end peripheral surfaces of the developing roller, and serves to prevent the leakage of the developer to the outside by being pressed against each of both the end peripheral surfaces of the developing roller. The developer and developing member according to the present disclosure are applied to the developer 105 and the developing roller 10. When a two-component developer is used, the developer container 109 may include in itself a stirring member for stirring the developer and a carrier as required.

<<Electrophotographic Process Cartridge and Electrophotographic Image Forming Apparatus>>

An electrophotographic process cartridge according to one aspect of the present disclosure is characterized in that the electrophotographic process cartridge is removably mounted onto the main body of an electrophotographic image forming apparatus, and includes the above-mentioned developing device.

An electrophotographic image forming apparatus according to one aspect of the present disclosure includes: an image-bearing member for bearing an electrostatic latent image; a charging device for primarily charging the image-bearing member; an exposing unit for forming an electrostatic latent image on the image-bearing member that is primarily charged; a developing member for developing the electrostatic latent image with a developer to form a developer image; and a transferring device for transferring the developer image. In addition, the electrophotographic image forming apparatus is characterized in that a developing device including the developing member is the above-mentioned developing device.

Figure 3:
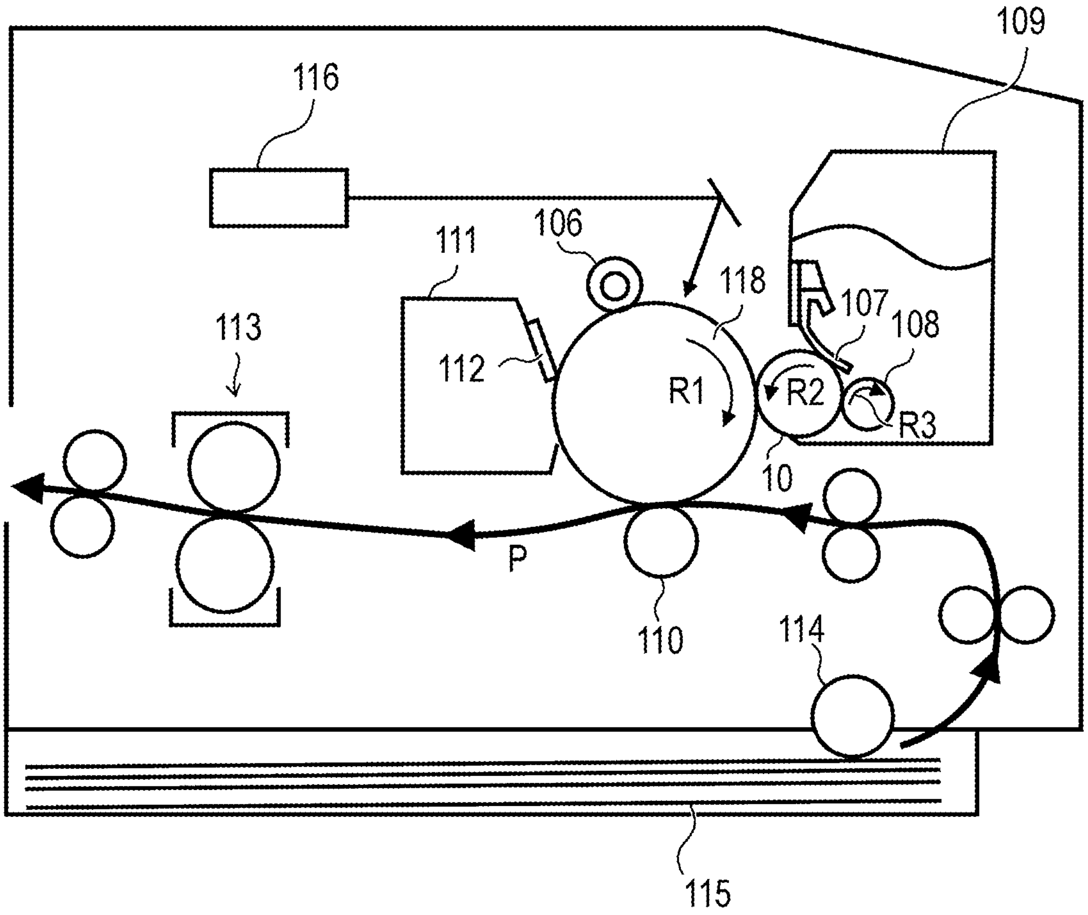
FIG. 3 is a schematic view of an electrophotographic image forming apparatus according to one aspect of the present disclosure.

The process cartridge and electrophotographic image forming apparatus according to one aspect of the present disclosure are described. A process cartridge including the above-mentioned developing device, the process cartridge being removably mounted onto the main body of an electrophotographic image forming apparatus, may be given as an example of the process cartridge of the present disclosure. In addition, FIG. 3 is a schematic configuration view for illustrating an example of an electrophotographic image forming apparatus including the above-mentioned developing device or having a process cartridge removably incorporated thereinto.

A charging roller 106 serving as a charging member arranged so as to be capable of charging a member in contact therewith, a transfer member (transfer roller) 110, a cleaner container 111, a cleaning blade 112, a fixing unit 113, a pickup roller 114, and the like are arranged around an image-bearing member 118 for bearing an electrostatic latent image. The image-bearing member 118 is charged by the charging roller 106. Then, laser light is applied from a laser generator 116 to the image-bearing member 118 to perform exposure, and hence an electrostatic latent image corresponding to a target image is formed. The electrostatic latent image on the image-bearing member 118 is developed with the developer in the developer container 109 of the process cartridge serving as a developing unit to provide an image. The development performed herein is so-called reversal development in which an exposed portion is developed with the developer. A transfer material (paper) P is conveyed from a sheet-feeding portion 115 into the apparatus by the pickup roller 114 and the like, and the image is transferred onto the transfer material (paper) P by the transfer member (transfer roller) 110 brought into abutment with the image-bearing member 118 through the transfer material (paper) P. The transfer material (paper) P having mounted thereon the image is conveyed to the fixing unit 113, and the developer is fixed onto the transfer material (paper) P. In addition, the developer remaining on the image-bearing member 118 is scraped off by the cleaning blade 112, and is stored in the cleaner container 111.

According to one aspect of the present disclosure, there can be provided the developing device that can stably form a high-quality electrophotographic image reduced in fogging even when many electrophotographic images are formed with a developer containing a magnetic substance under a high-temperature and high-humidity environment over a long time period.

In addition, according to another aspect of the present disclosure, there can be provided the electrophotographic process cartridge and the electrophotographic image forming apparatus each of which can form a high-quality electrophotographic image reduced in fogging with a developer containing a magnetic substance under a high-temperature and high-humidity environment over a long time period.

EXAMPLES

Now, embodiments of the present disclosure are described in detail by way of specific Examples. However, the technical scope of the present disclosure is not limited thereto.

<Production of Developing Roller D-1>

[Production of Elastic Roller 1]

A substrate obtained by applying a primer (product name DY35-051, manufactured by Dow Corning Toray Co., Ltd.) to a cored bar made of SUS304 having an outer diameter of 6 mm and a length of 264 mm, and heating the primer at a temperature of 150° C. for 20 minutes was prepared as an electro-conductive substrate. The conductive substrate was arranged in a cylindrical mold having an inner diameter of 11.5 mm so as to be concentric therewith.

An addition-type silicone rubber composition obtained by mixing materials shown in Table 1 below with a trimix (product name TX-15, manufactured by Inoue Mfg., Inc.) was used as a material for an intermediate layer, and the composition was injected into the mold heated to a temperature of 115° C. After having been injected, the material was heated and molded at a temperature of 120° C. for 10 minutes, and was cooled to room temperature, followed by removal from the mold. Thus, an elastic roller 1 in which an intermediate layer having a thickness of 2.71 mm was formed on the outer periphery of the conductive substrate was obtained.

TABLE 1

| Material | Part(s) by mass |
|---|---|
| Liquid dimethylpolysiloxane having two or more silicon atom-bonded alkenyl groups in a molecule thereof (product name: SF3000E, viscosity: 10,000 cP, vinyl group equivalent: 0.05 mmol/g, manufactured by KCC Corporation) | 100 |
| Platinum-based catalyst (product name: SIP6832.2, manufactured by Gelest, Inc.) | 0.048 |
| Dimethylpolysiloxane having two or more silicon atom-bonded hydrogen atoms in a molecule thereof (product name: SP6000P, Si—H group equivalent: 15.5 mmol/g, manufactured by KCC Corporation) | 0.5 |
| Carbon black (product name: TOKABLACK #7360SB, manufactured by Tokai Carbon Co., Ltd.) | 6.0 |

[Formation of Surface Layer 1]

First, a coating material for forming a resin layer 1 was prepared. That is, materials except roughness-forming particles in Table 2 below were stirred and mixed. Next, methyl ethyl ketone (manufactured by Kishida Chemical Co., Ltd.) was added to the mixture so that a solid content concentration became 30 mass %, and the materials were mixed, followed by uniform dispersion with a sand mill. Methyl ethyl ketone was further added to the mixed liquid to adjust the solid content concentration to 25 mass %. After that, the roughness-forming particles in Table 2 were added to the mixture, and the materials were stirred and dispersed with a ball mill to provide a coating material 1 for forming a resin layer. The elastic roller 1 was immersed in the coating material 1 for forming a resin layer, and the coating material was applied to the roller so that the dry thickness of its coating film became 15 μm. After that, the coating film was dried and cured by being heated at a temperature of 130° C. for 60 minutes. Thus, the resin layer 1 was formed on the intermediate layer.

TABLE 2

| Material | Part(s) by mass |
|---|---|
| Polycarbonate polyol (product name: C2090, manufactured by Kuraray Co., Ltd.) | 100 |
| Polymeric MDI (product name: MR-400, manufactured by Tosoh Corporation) | 37.2 |
| Carbon black (product name: SUNBLACK X15, manufactured by Asahi Carbon Co., Ltd.) | 29.3 |
| Modified silicone oil (product name: TSF4445, manufactured by Momentive Performance Materials Japan LLC) | 0.6 |
| Roughness-forming particles (product name: DAIMICBEAZ UCN-5090, manufactured by Dainichiseika Color & Chemicals Mfg. Co., Ltd.) | 17.8 |

Subsequently, an impregnation treatment liquid 1 containing an acrylic monomer was impregnated into the resin layer 1, and was cured to form a surface layer 1.

First, materials shown in Table 3 below were dissolved and mixed to prepare the impregnation treatment liquid 1. Next, the elastic roller having formed thereon the resin layer was treated by being immersed in the impregnation treatment liquid 1 for 2 seconds so that the acrylic monomer component was impregnated into the layer. After that, the elastic roller was air-dried at a temperature of 25° C. for 30 minutes, and was dried at a temperature of 90° C. for 1 hour so that the solvent of the liquid was volatilized. While the elastic roller after the drying was rotated, UV light was applied to its outer peripheral surface so that its integrated light quantity became 15,000 mJ/$cm^2$, thereby curing the acrylic monomer impregnated into the resin layer. Thus, the surface layer 1 was formed. A high-pressure mercury lamp (product name: HANDY TYPE UV CURING DEVICE, manufactured by Marionetwork) was used as a UV irradiation device. Thus, a developing roller D-1 was obtained.

TABLE 3

| Material | Part(s) by mass |
|---|---|
| Bifunctional acrylic monomer (product name: EBECRYL 145, manufactured by Daicel-Allnex Ltd.) | 6.0 |
| Photopolymerization initiator (product name: IRGACURE 184, manufactured by BASF SE) | 0.2 |
| Solvent (product name: methyl ethyl ketone, manufactured by Kishida Chemical Co., Ltd.) | 100 |
| Polyether monool (product name: NEWPOL 50HB100, manufactured by Sanyo Chemical Industries, Ltd.) | 3 |

[Production of Developing Rollers D-2 to D-32]

Coating materials 2 to 21 for forming resin layers were prepared in the same manner as in the coating material for forming the resin layer 1 except that formulations shown in Table 4-1 and Table 4-2 were adopted. In addition, impregnation treatment liquids 2 and 3 were prepared in the same manner as in the impregnation treatment liquid 1 except that formulations shown in Table 5 were adopted.

Then, developing rollers D-2 to D-32 were each produced in the same manner as in the method of forming the surface layer 1 except that the combination of a coating material for forming a resin layer and an impregnation treatment liquid shown in Table 6 was adopted.

TABLE 4-1

| | | Number of coating material for forming resin layer | | | | | | | | | | | |
|---|---|---|---|---|---|---|---|---|---|---|---|---|---|
| | Material name | 1 | 2 | 3 | 4 | 5 | 6 | 7 | 8 | 9 | 10 | 11 | 12 |
| Polyol | C2090 | 100 | — | — | — | — | — | 100 | — | — | — | — | — |
| | T5652 | — | 100 | — | — | — | — | — | 100 | — | — | — | — |
| | NP400 | — | — | 100 | — | — | — | — | — | 100 | — | — | — |
| | P2050 | — | — | — | 100 | — | — | — | — | — | 100 | — | — |
| | PTGL2000 | — | — | — | — | 100 | — | — | — | — | — | 100 | — |
| | PTMG2000 | — | — | — | — | — | 100 | — | — | — | — | — | 100 |
| Isocyanate | MR-400 | 37.2 | 37.2 | 930 | 37.2 | 37.2 | 37.2 | 37.2 | 37.2 | 930 | 37.2 | 37.2 | 37.2 |
| Carbon black | SUNBLACK X15 | 29.3 | 29.3 | 29.3 | 29.3 | 29.3 | 29.3 | 29.3 | 29.3 | 29.3 | 29.3 | 29.3 | 29.3 |
| Additive component | TSF4445 | 0.6 | 0.6 | 0.6 | 0.6 | 0.6 | 0.6 | — | — | — | — | — | — |
| | MEGAFACE F-430 | — | — | — | — | — | — | 0.6 | 0.6 | 0.6 | 0.6 | 0.6 | 0.6 |
| Roughness-forming particles | UCN-5090 | 17.8 | 17.8 | 17.8 | 17.8 | 17.8 | 17.8 | 17.8 | 17.8 | 17.8 | 17.8 | 17.8 | 17.8 |
| Others | LCB-19 | — | — | — | — | — | — | — | — | — | — | — | — |

TABLE 4-2

| | | Number of coating material for forming resin layer | | | | | | | | |
|---|---|---|---|---|---|---|---|---|---|---|
| | Material name | 13 | 14 | 15 | 16 | 17 | 18 | 19 | 20 | 21 |
| Polyol | C2090 | 100 | — | — | — | — | — | 100 | — | — |
| | T5652 | — | 100 | — | — | — | — | — | — | 100 |
| | NP400 | — | — | 100 | — | — | — | — | — | — |
| | P2050 | — | — | — | 100 | — | — | — | — | — |
| | PTGL2000 | — | — | — | — | 100 | — | — | — | — |
| | PTMG2000 | — | — | — | — | — | 100 | — | 100 | — |
| Isocyanate | MR-400 | 37.2 | 37.2 | 930 | 37.2 | 37.2 | 37.2 | 69.1 | 26.6 | 37.2 |
| Carbon black | SUNBLACK X15 | 29.3 | 29.3 | 29.3 | 29.3 | 29.3 | 29.3 | 29.3 | 29.3 | 29.3 |
| Additive | TSF4445 | — | — | — | — | — | — | — | — | — |
| component | MEGAFACE F-430 | — | — | — | — | — | — | — | — | — |
| Roughness-forming particles | UCN-5090 | 17.8 | 17.8 | 17.8 | 17.8 | 17.8 | 17.8 | 17.8 | 17.8 | 17.8 |
| Others | LCB-19 | — | — | — | — | — | — | — | — | 5 |

TABLE 5

| Classification | Material name | Impregnation treatment liquid 1 | Impregnation treatment liquid 2 | Impregnation treatment liquid 3 |
|---|---|---|---|---|
| Acrylic | EBECRYL 145 | 6.0 | — | — |
| monomer | NK Ester 9G | — | 6.0 | — |
| | NK Ester 14G | — | — | 6.0 |
| Initiator | IRGACURE 184 | 0.2 | 0.2 | 0.2 |
| Solvent | Methyl ethyl ketone | 100 | 100 | 100 |

The numerical values in Table 4 and Table 5 represent the blending amounts of the respective materials in the unit of part(s) by mass.

The respective materials shown in Table 4 and Table 5 are as described below.

"C2090": product name; manufactured by Kuraray Co., Ltd., polycarbonate polyol having a side-chain methyl group "T5652": product name; manufactured by Asahi Kasei Corporation, polycarbonate polyol "NP400": product name; manufactured by Sanyo Chemical Industries, Ltd., nitrogen-containing polyol "P2050": product name; manufactured by Kuraray Co., Ltd., polyester polyol "PTGL2000": product name; manufactured by Hodogaya Chemical Co., Ltd., polyether polyol having a side-chain methyl group "PTMG2000": product name; manufactured by Mitsubishi Chemical Corporation, polyether polyol "MR-400" ("Millionate MR-400"; product name; manufactured by Tosoh Corporation, isocyanate compound (Polymeric MDI)

"SUNBLACK X15": product name; manufactured by Asahi Carbon Co., Ltd., carbon black "TSF4445": product name; manufactured by Momentive Performance Materials Japan LLC, modified silicone oil "MEGAFACE F-430": product name; manufactured by DIC Corporation, fluorine group-containing/hydrophilic group-containing/lipophilic group-free oligomer "UCN-5090" ("DAIMICBEAZ UCN-5090"): product name; manufactured by Dainichiseika Color & Chemicals Mfg. Co., Ltd., crosslinked urethane resin particles "LCB-19": product name; manufactured by Mitsubishi Chemical Corporation, chain acrylic resin "EBECRYL 145": product name; manufactured by Daicel-Allnex Ltd., bifunctional acrylic monomer; PO-modified neopentyl glycol diacrylate "NK Ester 9G": product name; manufactured by Shin-Nakamura Chemical Co., Ltd., bifunctional acrylic monomer "NK Ester 14G": product name; manufactured by Shin-Nakamura Chemical Co., Ltd., bifunctional acrylic monomer "IRGACURE 184": product name; manufactured by BASF SE, photopolymerization initiator

TABLE 6

| | Resin layer | | Impregnation treatment liquid | |
|---|---|---|---|---|
| Developing roller | Kind of coating material | Solid content concentration % | Kind of liquid | Impregnation time |
| D-1 | Coating material 1 for resin layer | 25 | Impregnation treatment liquid 1 | 3 seconds |
| D-2 | Coating material 2 for resin layer | 25 | Impregnation treatment liquid 1 | 3 seconds |
| D-3 | Coating material 3 for resin layer | 25 | Impregnation treatment liquid 1 | 3 seconds |
| D-4 | Coating material 4 for resin layer | 25 | Impregnation treatment liquid 1 | 3 seconds |
| D-5 | Coating material 5 for resin layer | 25 | Impregnation treatment liquid 1 | 3 seconds |
| D-6 | Coating material 6 for resin layer | 25 | Impregnation treatment liquid 1 | 3 seconds |
| D-7 | Coating material 1 for resin layer | 25 | Impregnation treatment liquid 2 | 3 seconds |
| D-8 | Coating material 2 for resin layer | 25 | Impregnation treatment liquid 2 | 3 seconds |
| D-9 | Coating material 3 for resin layer | 25 | Impregnation treatment liquid 2 | 3 seconds |
| D-10 | Coating material 4 for resin layer | 25 | Impregnation treatment liquid 2 | 3 seconds |
| D-11 | Coating material 5 for resin layer | 25 | Impregnation treatment liquid 2 | 3 seconds |
| D-12 | Coating material 6 for resin layer | 25 | Impregnation treatment liquid 2 | 3 seconds |
| D-13 | Coating material 7 for resin layer | 25 | Impregnation treatment liquid 1 | 3 seconds |

TABLE 6-continued

| Developing roller | Resin layer: Kind of coating material | Resin layer: Solid content concentration % | Impregnation treatment liquid: Kind of liquid | Impregnation treatment liquid: Impregnation time |
|---|---|---|---|---|
| D-14 | Coating material 8 for resin layer | 25 | Impregnation treatment liquid 1 | 3 seconds |
| D-15 | Coating material 9 for resin layer | 25 | Impregnation treatment liquid 1 | 3 seconds |
| D-16 | Coating material 10 for resin layer | 25 | Impregnation treatment liquid 1 | 3 seconds |
| D-17 | Coating material 11 for resin layer | 25 | Impregnation treatment liquid 1 | 3 seconds |
| D-18 | Coating material 12 for resin layer | 25 | Impregnation treatment liquid 1 | 3 seconds |
| D-19 | Coating material 13 for resin layer | 25 | Impregnation treatment liquid 1 | 3 seconds |
| D-20 | Coating material 14 for resin layer | 25 | Impregnation treatment liquid 1 | 3 seconds |
| D-21 | Coating material 15 for resin layer | 25 | Impregnation treatment liquid 1 | 3 seconds |
| D-22 | Coating material 16 for resin layer | 25 | Impregnation treatment liquid 1 | 3 seconds |
| D-23 | Coating material 17 for resin layer | 25 | Impregnation treatment liquid 1 | 3 seconds |
| D-24 | Coating material 18 for resin layer | 25 | Impregnation treatment liquid 1 | 3 seconds |
| D-25 | Coating material 2 for resin layer | 25 | Impregnation treatment liquid 3 | 3 seconds |
| D-26 | Coating material 2 for resin layer | 15 | Impregnation treatment liquid 1 | 3 seconds |
| D-27 | Coating material 2 for resin layer | 40 | Impregnation treatment liquid 1 | 3 seconds |
| D-28 | Coating material 2 for resin layer | 13 | Impregnation treatment liquid 1 | 3 seconds |
| D-29 | Coating material 2 for resin layer | 42 | Impregnation treatment liquid 1 | 3 seconds |
| D-30 | Coating material 19 for resin layer | 25 | Impregnation treatment liquid 1 | 3 seconds |
| D-31 | Coating material 20 for resin layer | 25 | Impregnation treatment liquid 1 | 3 seconds |
| D-32 | Coating material 2 for resin layer | 25 | Impregnation treatment liquid 1 | 12 minutes |

[Production of Developing Rollers DH-1 and DH-2]

Other materials shown in the column "Components (1)" of Table 7 were added to 100 parts by mass of a styrene-butadiene rubber (SBR) (product name: TUFDENE 2003, manufactured by Asahi Kasei Corporation), and the mixture was kneaded with a closed mixer regulated to 80° C. for 15 minutes. Materials shown in the column "Components (2)" of Table 7 were added to the kneaded product. Next, the mixture was kneaded with a twin roll machine cooled to a temperature of 25° C. for 10 minutes to provide an electro-conductive rubber composition No. 1.

TABLE 7

| | Material | Part(s) by mass |
|---|---|---|
| Components (1) | Styrene-butadiene rubber (SBR) (product name: TUFDENE 2003, manufactured by Asahi Kasei Corporation) | 100 |
| | Carbon black (product name: KETJENBLACK EC600JD, manufactured by Lion Corporation) | 8 |
| | Carbon black (product name: SEAST 5, manufactured by Tokai Carbon Co., Ltd.) | 40 |
| | Zinc oxide (product name: ZINC WHITE TYPE 2, manufactured by Sakai Chemical Industry Co., Ltd.) | 5 |
| | Zinc stearate (product name: SZ-2000, manufactured by Sakai Chemical Industry Co., Ltd.) | 1 |
| | Calcium carbonate (product name: NANOX #30, manufactured by Maruo Calcium Co., Ltd.) | 15 |
| Components (2) | Sulfur | 1 |
| | Tetrabenzylthiuram disulfide (product name: NOCCELER TBzTD, manufactured by Ouchi Shinko Chemical Industrial Co., Ltd.) | 1 |
| | Tetramethylthiuram monosulfide (product name: NOCCELER TS, manufactured by Ouchi Shinko Chemical Industrial Co., Ltd.) | 1 |

A columnar body made of stainless steel (SUS304) having an outer diameter of 6 mm and a length of 270 mm was prepared. An electro-conductive vulcanized adhesive (product name: METALOC U-20, manufactured by Toyokagaku Kenkyusho Co., Ltd.) was applied and baked to the peripheral surface of the columnar body to prepare an electro-conductive substrate.

The peripheral surface of the substrate serving as a central axis was coated with the produced conductive rubber composition No. 1 in a cylindrical manner by using an extrusion molding device including a crosshead. The thickness of the conductive rubber composition coating the peripheral surface was adjusted to 2.75 mm.

The roller after the extrusion was vulcanized in an air-heating furnace at 160° C. for 1 hour, and then the end portions of its rubber layer were removed so that the length of a roller to be obtained became 235 mm Thus, a roller having a preliminary coating layer was produced.

The outer peripheral surface of the resultant roller having the preliminary coating layer was ground so as to have a crown shape with a grinder of a plunge cut grinding system to form a roller No. 1 having a crown shape. The outer diameter of the roller No. 1 was measured with a laser length-measuring machine (product names: CONTROLLER LS-7000 and SENSOR HEAD LS-7030R, manufactured by Keyence Corporation). The measurement was performed at pitches of 1 mm, and a difference between the average of the outer diameters at a position distant from an end portion of the roller No. 1 by 10 mm and the average of the outer diameters at the central position of the roller (preliminary coating layer) 1 was defined as a crown amount. The average outer diameter of the position distant from the end portion of the roller No. 1 by 10 mm was 10.018 mm, and the average outer diameter of the central portion thereof was 10.068 mm, and hence the crown amount was 50 μm. Next, the roller No. 1 was subjected to post-heat treatment with an air-heating furnace under an air atmosphere at the temperature of 195° C. for 1 hour to provide an elastic roller H1.

Developing rollers DH-1 and DH-2 were each obtained in the same manner as in the developing roller D-1 except that a coating material for a resin layer or an impregnation treatment liquid shown in Table 8 was used for the resultant elastic roller H1.

TABLE 8

| | Resin layer | | Impregnation treatment liquid | |
|---|---|---|---|---|
| Developing roller | Kind of coating material | Solid content concentration % | Kind of liquid | Impregnation time |
| DH-1 | — | — | Impregnation treatment liquid 1 | 3 seconds |
| DH-2 | Coating material 21 for resin layer | 25 | — | — |

<Developer>

[Production of Magnetic Substance 1]

The following materials were mixed into an aqueous solution of ferrous sulfate to prepare an aqueous solution containing ferrous hydroxide: 1.00 equivalent to 1.10 equivalents of a caustic soda solution with respect to an iron element; $P_2O_5$ whose amount was 0.15 mass % in terms of phosphorus element with respect to the iron element; and $SiO_2$ whose amount was 0.50 mass % in terms of silicon element with respect to the iron element. The pH of the aqueous solution was set to 8.0, and an oxidation reaction was performed at 85° C. while air was blown into the solution. Thus, a slurry liquid having a seed crystal was prepared.

Next, 0.90 equivalent to 1.20 equivalents of an aqueous solution of ferrous sulfate with respect to the original alkali amount (sodium component of caustic soda) was added to the slurry liquid. After that, the pH of the slurry liquid was maintained at 7.6, and an oxidation reaction was advanced while air was blown into the liquid. Thus, a water-containing slurry liquid containing magnetic iron oxide was obtained. The water-containing slurry liquid was filtered and washed, and was then removed once. At this time, a small amount of a water-containing sample was collected, and its water content was measured. Next, the water-containing sample was loaded into another aqueous medium without being dried, and the mixture was stirred. At the same time, while the slurry was circulated, the magnetic iron oxide was redispersed with a pin mill to adjust the pH of the redispersion liquid to about 4.8. Then, while the liquid was stirred, 1.6 parts by mass of a n-hexyltrimethoxysilane coupling agent with respect to 100 parts by mass of the magnetic iron oxide was added to the liquid to perform hydrolysis.

The amount of the magnetic iron oxide was calculated as a value obtained by subtracting the water content from the amount of the water-containing sample. After that, stirring was sufficiently performed, and the pH of the dispersion liquid was set to 8.6, followed by surface treatment with a silane coupling agent. The produced hydrophobic magnetic substance was filtered with a filter press, and was washed with a large amount of water. After that, the washed product was dried at 100° C. for 15 minutes and at 90° C. for 30 minutes, and the resultant particles were subjected to shredding treatment to provide a magnetic substance 1 having a volume-average particle diameter of 0.21 μm.

[Production of Polyester Resin 1]

Materials shown in Table 9 below were loaded into a reaction vessel including a cooling tube, a stirring machine, and a nitrogen-introducing tube, and were caused to react with each other at 230° C. in a stream of nitrogen for 10 hours while water to be produced was evaporated. Next, the materials were caused to react with each other under a reduced pressure of from 5 mmHg to 20 mmHg, and at the time point when an acid value of 2 mgKOH/g or less was achieved, the resultant was cooled to 180° C. 10 Parts by mass of trimellitic anhydride was added to the cooled product, and the materials were caused to react with each other at normal pressure under a closed state for 2 hours. After that, the reaction product was removed and cooled to room temperature. After that, the cooled product was pulverized to provide a polyester resin 1. The main peak molecular weight (Mp) of the polyester resin 1 measured by gel permeation chromatography (GPC) was 10,500.

TABLE 9

| Material | Part(s) by mass |
|---|---|
| Propylene oxide 2-mol adduct of bisphenol A | 75 |
| Propylene oxide 3-mol adduct of bisphenol A | 25 |
| Terephthalic acid | 100 |
| Titanium-based catalyst (titanium dihydroxy-bis(triethanolaminate)) | 0.25 |

[Production of Developer Particles 1]

In a vessel, 450 parts by mass of a 0.1 M aqueous solution of $Na_3PO_4$ was loaded into 720 parts by mass of ion-exchanged water, and the mixture was warmed to 60° C. After that, 67.7 parts by mass of a 1.0 M aqueous solution of $CaCl_2$ was added to the mixture to provide an aqueous medium containing a dispersion stabilizer. Meanwhile, materials shown in the column "Components 1" of Table 10 below were uniformly dispersed and mixed with ATTRITOR (product name, manufactured by Mitsui Miike Chemical Engineering Machinery, Co., Ltd.) to provide a polymerizable monomer composition. The polymerizable monomer composition was warmed to 60° C., and a material shown in the column "Component 2" of Table 10 below was added, mixed, and dissolved into the composition. After that, a material shown in the column "Component 3" was added, mixed, and dissolved as a polymerization initiator into the solution to provide a developer composition.

TABLE 10

| | Material | Part(s) by mass |
|---|---|---|
| Component 1 | Styrene | 78 |
| | n-Butyl acrylate | 22 |
| | Divinylbenzene | 0.6 |
| | Iron complex of monoazo dye (T-77: manufactured by Hodogaya Chemical Co., Ltd.) | 3 |
| | Magnetic substance 1 | 90 |
| | Polyester resin 1 | 5 |
| Component 2 | Fischer-Tropsch wax (melting point: 74° C., number-average molecular weight Mn: 500) | 15 |
| Component 3 | Dilauroyl peroxide | 7 |

The developer composition was loaded into the aqueous medium, and the mixture was stirred under a Na atmosphere at 60° C. with T. K. HOMOMIXER (product name, manufactured by Tokushu Kika Kogyo Co., Ltd.) at 12,000 rpm for 10 minutes to be granulated. After that, the granulated product was subjected to a reaction at 74° C. for 6 hours while being stirred with a paddle stirring blade. After the completion of the reaction, the suspension was cooled, and hydrochloric acid was added to wash the suspension. After that, the washed product was filtered and dried to provide developer particles 1. The resultant developer particles 1 that were a magnetic developer had a weight-average particle diameter of 8.0 μm and an average circularity of 0.938.

[Production of Developer T-1]

Materials shown in Table 11 below were loaded into HENSCHEL MIXER FM10C (manufactured by Mitsui Miike Chemical Engineering Machinery, Co., Ltd.), and were subjected to mixing treatment at a constant number of revolutions of 4,000 rpm for 5 minutes. After the mixing treatment, coarse particles and the like were removed with a circular vibration sieving machine having arranged thereon a screen having a diameter of 500 mm and an aperture of 75 μm. Thus, a developer T-1 was obtained.

TABLE 11

| Material | Part(s) by mass |
|---|---|
| Developer particles 1 | 100 |
| Silica fine particles 1 (number-average particle diameter of the primary particles of a silica source material: 7 nm, BET specific surface area: 300 $m^2/g$, fixation ratio of a silicone oil on a carbon basis: 98%, apparent density: 25 g/L, number-average particle diameter of the primary particles of silica fine particles after treatment: 8 nm) | 1.3 |

[Production of Developer T-2]

A developer T-2 was obtained in the same manner as in the production of the developer T-1 except that the amount of the magnetic substance 1 was changed from 90 parts to 60 parts.

[Production of Developer TH-1]

A developer TH-1 was obtained in the same manner as in the production of the developer T-1 except that the amount of the magnetic substance 1 was changed from 90 parts to 0 parts.

The numbers of parts by mass of the magnetic substance 1 in developer particle raw material components 1 are shown in Table 12 below.

TABLE 12

| Developer | Number of parts by mass of magnetic substance 1 in developer particle raw material components 1 |
|---|---|
| T-1 | 90 |
| T-2 | 60 |
| TH-1 | 0 |

The resultant developing rollers and developers were subjected to the following evaluations.

[Measurement of T1, T2, T3, A1, and A2]

The thermal chromatograms of a first region from the outer surface of each of the developing rollers to a position at a depth of 0.1 μm from the outer surface of the surface layer, a second region having a thickness of 0.1 μm from the rear surface of the surface layer of the roller toward the front surface thereof, and a third region corresponding to a depth of 1.0 μm or more and 1.1 μm or less from the front surface were obtained by the above-mentioned microsampling mass spectrometry. The peak top temperatures T1, T2, and T3 of thermal chromatograms derived from the crosslinked urethane resin in the respective first region, second region, and third region were determined from the resultant thermal chromatograms. In addition, the peak top temperature A1 of a thermal chromatogram derived from a crosslinked acrylic resin in the first region was obtained. Further, the peak top temperature A2 of a thermal chromatogram derived from the crosslinked acrylic resin, the thermal chromatogram being measured from a second sample obtained by decomposing the crosslinked urethane resin in a sample sampled from the first region, was obtained.

The samples of the respective regions were collected by using a microsampling method with a FIB-SEM (product name NVision 40, manufactured by SII NanoTechnology Inc.).

Specifically, first, a notch was made with a razor from the surface of the developing roller toward the substrate to cut out a rubber piece in a state in which the sections of the surface layer and the intermediate layer were exposed. The rubber piece was arranged on the sample stand of the SEM so that its roller sectional portion served as an upper surface, and a sampling probe was fixed to a position corresponding to the roller surface of the rubber piece. Further, cutting treatment with the FIB was performed at a position corresponding to an inside from a surface corresponding to the roller surface by 0.1 μm to collect the sample of the first region.

With regard to the second region, cutting treatment with the FIB was performed at a position distant from an interface between the rear surface of the surface layer and the intermediate layer by 1.0 μm toward the front surface. The sampling probe was fixed to the resultant cut surface, and cutting treatment with the FIB was performed at a position corresponding to an inside from the cut surface by 0.1 μm to collect the sample of the second region.

In addition, with regard to the third region, cutting treatment with the FIB was performed at a position in the same rubber piece as that described above corresponding to an inside from the surface corresponding to the roller surface by 1.0 μm to expose the third region. The sampling probe was fixed to the exposed surface, and cutting treatment with the FIB was performed at a position corresponding to an inside from the exposed surface by 0.1 μm to collect the sample of the third region.

In each cutting treatment, the acceleration voltage and beam current of the FIB were set to 30 kV and 27 mA, respectively.

[Pyridine Decomposition Method]

A pyridine decomposition method is a method of selectively decomposing a urethane bond. When the pyridine decomposition method is performed in a sample having the IPN structure of the crosslinked acrylic resin and the crosslinked urethane resin, the crosslinked acrylic resin after the removal of a structure derived from the crosslinked urethane resin can be obtained.

A change in peak temperature of a thermal chromatogram caused by the presence or absence of the IPN structure can be grasped from the resultant crosslinked acrylic resin. The pyridine decomposition method was specifically performed by the following method.

A sample having a thickness of 0.1 μm was cut out of the surface of the developing roller with a microtome, and 500 mg of the sample was collected. 0.5 Milliliter of a mixed liquid obtained by mixing pyridine (manufactured by Wako Pure Chemical Industries, Ltd.) and water at 3:1 was added to the resultant sample, and the sample was decomposed by being heated in a closed container made of a fluorine resin (TEFLON (trademark)) with a stainless steel jacket at 130° C. for 15 hours. The resultant decomposed product was treated under reduced pressure so that pyridine was removed. The value of the A2 was obtained by performing the above-mentioned microsampling mass spectrometry through use of the sample thus obtained.

[Thickness Measurement]

The thickness of the surface layer was determined as follows: sections at 3 sites in the axial direction of the surface layer and 3 sites in the circumferential direction thereof, i.e., a total of 9 sites were observed with an optical microscope or an electron microscope, and thicknesses in the sections were measured; and the average of the measured values was adopted as the "thickness" of the surface layer.

[Volume Resistivity Measurement]

The volume resistivity of the surface layer was measured with an atomic force microscope (AFM) (Q-scope 250: Quesant) by an electro-conductive mode. First, a sheet having a width of 2 mm and a length of 2 mm was cut out of the surface layer of an electro-conductive roller with a manipulator. The sheet was cut out of the surface layer so that one surface of the sheet included the surface of the surface layer. Next, platinum was deposited from the vapor onto the surface layer-surface side of the sheet so as to have a thickness of 80 nm. Next, a DC power source (6614C: Agilent Technologies) was connected to the surface subjected to the platinum deposition, and a voltage of 10 V was applied thereto. The free end of a cantilever was brought into contact with the other surface of the surface layer, and a current image was obtained through the main body of the AFM. Current values were measured on the surfaces at 100 randomly selected sites, and the volume resistivity was calculated from the average current value of the sites having the 10 lowest current values and the measurement result of the thickness. Measurement conditions are described below.

Measurement mode: contact
Cantilever: CSC17
Measurement range: 10 nm×10 nm
Scan rate: 4 Hz
Applied voltage: 10 V Example 1

A laser printer (product name LaserJet Pro P1606, manufactured by Hewlett-Packard Company) serving as an electrophotographic image forming apparatus was subjected to the following specification changes. First, the developing bias of the printer was changed from an alternating current (AC) to a direct current (DC). Next, the developing bias was set to −500 V, and a light portion potential and a dark portion potential on the photosensitive drum of the printer were set to −300 V and −800 V, respectively. Accordingly, in the image forming apparatus, a Vcontrast is 200 V and a Vback is 300 V.

The developing roller D-1 produced in the foregoing was stored in the process cartridge subjected to such specification changes, and the developer T-1 produced in the foregoing was loaded thereinto to produce a developing device. Although the developing device of the process cartridge was originally a magnetic noncontact-type developing device, the developing device was turned into a developing device of a magnetic contact system by mounting the cartridge with the developing roller having an outer diameter of 11.4 mm.

[Measurement of Q/M]

The produced process cartridge was loaded into the above-mentioned laser printer, and the printer was aged under a high-temperature and high-humidity (H/H) environment for 7 days. Then, while the environment was not changed, the operation of outputting a white solid image was performed with the laser printer to establish a state in which the surface of the developing roller was coated with the developer. Next, under the same environment, the developer carried on the developing roller was sucked and collected with a metal cylindrical tube and a cylindrical filter. At that time, a charge quantity Q (μC) stored in a capacitor through the metal cylindrical tube and the mass M (g) of the developer sucked therethrough were measured. A charge quantity Q/M (μC/g) per unit mass was calculated from those values. When a negatively chargeable developer is used, the sign of its Q/M is negative. It can be said that as the absolute value of the Q/M becomes larger, the ability of the developing roller to impart charge to the developer becomes higher.

[Fogging Measurement]

Immediately after the measurement of the Q/M, fogging measurement was performed by such a procedure as described below. First, under the H/H environment, the printer was stopped during the output of the white solid image. At this time, the developer adhering onto the photosensitive member was peeled off with a tape, and the amount (%) in which the reflectance of the tape reduced with respect to a reference was measured with a reflection densitometer (product name "TC-6DS/A"; manufactured by Tokyo Denshoku Co., Ltd.). The measured value was adopted as a fogging value. A reduction in reflectance results from a state in which the developer is transferred onto the white background portion of paper where originally, no image is printed and a blank dot should be formed. Accordingly, the fogging value is preferably as small as possible.

[Ghost Evaluation]

The printer and the cartridge used in the measurement of the Q/M and the fogging measurement were aged under an environment at a temperature of 15° C. and a relative humidity of 10% for 1 day. After that, an image for a ghost examination was produced as follows: such an image that solid black marks (squares and circles) were arranged at equal intervals on a white background was output in the region of an image end corresponding to one round of the developing roller; and a halftone image was output in the region except the foregoing.

The extent to which the ghost of the marks appeared on the output halftone image was evaluated by the following criteria.

Rank AA: No density difference is observed.

Rank A: A slight density difference can be observed depending on the angle at which the image is observed.

Rank B: A ghost corresponding to one round of the developing roller can be observed.

Rank C: A ghost corresponding to one round of the developing roller can be clearly observed.

Rank D: A ghost can be observed over two or more rounds of the developing roller.

Example 2 to Example 33

Evaluations were performed in the same manner as in Example 1 except that the developing roller and the developer were changed to those shown in Table 13. The results are shown in Table 13-1 and Table 13-2.

TABLE 13-1

| Example | Developing roller | Developer | A1 ° C. | A2 ° C. | T1 ° C. | T2 ° C. | T3 ° C. | Surface layer thickness μm | Volume resistivity Ω · cm | Q/M μC/g | Fogging % | Ghost |
|---|---|---|---|---|---|---|---|---|---|---|---|---|
| 1 | D-1 | T-1 | 397.0 | 394.0 | 384.1 | 380.0 | 381.1 | 15.0 | $5.6 \times 10^{15}$ | −23 | 1.8 | A |
| 2 | D-2 | T-1 | 396.7 | 393.7 | 383.8 | 379.7 | 380.8 | 15.0 | $8.2 \times 10^{14}$ | −20 | 2.0 | AA |
| 3 | D-3 | T-1 | 396.0 | 393.0 | 383.1 | 379.0 | 380.1 | 15.0 | $5.1 \times 10^{13}$ | −18 | 2.3 | AA |
| 4 | D-4 | T-1 | 395.3 | 392.3 | 382.4 | 378.3 | 379.4 | 15.0 | $5.6 \times 10^{12}$ | −17 | 2.4 | AA |
| 5 | D-5 | T-1 | 395.0 | 392.0 | 382.1 | 378.0 | 379.1 | 15.0 | $4.0 \times 10^{11}$ | −15 | 2.6 | AA |
| 6 | D-6 | T-1 | 394.0 | 391.0 | 381.1 | 377.0 | 378.1 | 15.0 | $5.7 \times 10^{11}$ | −14 | 2.8 | AA |
| 7 | D-7 | T-1 | 396.0 | 393.0 | 383.1 | 379.0 | 380.1 | 15.0 | $5.6 \times 10^{15}$ | −22 | 1.9 | A |
| 8 | D-8 | T-1 | 395.7 | 392.7 | 382.8 | 378.7 | 379.8 | 15.0 | $8.2 \times 10^{14}$ | −19 | 2.1 | AA |
| 9 | D-9 | T-1 | 395.0 | 392.0 | 382.1 | 378.0 | 379.1 | 15.0 | $5.1 \times 10^{13}$ | −17 | 2.4 | AA |
| 10 | D-10 | T-1 | 394.3 | 391.3 | 381.4 | 377.3 | 378.4 | 15.0 | $5.6 \times 10^{12}$ | −16 | 2.7 | AA |
| 11 | D-11 | T-1 | 394.0 | 391.0 | 381.1 | 377.0 | 378.1 | 15.0 | $4.0 \times 10^{11}$ | −14 | 2.8 | AA |
| 12 | D-12 | T-1 | 393.0 | 390.0 | 380.1 | 376.0 | 377.1 | 15.0 | $5.7 \times 10^{11}$ | −13 | 2.9 | AA |
| 13 | D-13 | T-1 | 396.0 | 393.0 | 383.1 | 379.0 | 380.1 | 15.0 | $5.6 \times 10^{15}$ | −22 | 1.9 | A |
| 14 | D-14 | T-1 | 396.7 | 393.7 | 383.8 | 379.7 | 380.8 | 15.0 | $8.2 \times 10^{14}$ | −19 | 2.1 | AA |
| 15 | D-15 | T-1 | 396.0 | 393.0 | 383.1 | 379.0 | 380.1 | 15.0 | $5.1 \times 10^{13}$ | −17 | 2.4 | AA |
| 16 | D-16 | T-1 | 395.3 | 392.3 | 382.4 | 378.3 | 379.4 | 15.0 | $5.6 \times 10^{12}$ | −16 | 2.7 | AA |
| 17 | D-17 | T-1 | 395.0 | 392.0 | 382.1 | 378.0 | 379.1 | 15.0 | $4.0 \times 10^{11}$ | −14 | 2.8 | AA |
| 18 | D-18 | T-1 | 394.0 | 391.0 | 381.1 | 377.0 | 378.1 | 15.0 | $5.7 \times 10^{11}$ | −13 | 2.9 | AA |
| 19 | D-19 | T-1 | 396.5 | 393.5 | 383.6 | 379.5 | 380.6 | 15.0 | $5.6 \times 10^{15}$ | −21 | 1.9 | A |
| 20 | D-20 | T-1 | 396.2 | 393.2 | 383.3 | 379.2 | 380.3 | 15.0 | $8.2 \times 10^{14}$ | −18 | 2.3 | AA |

TABLE 13-2

| Example | Developing roller | Developer | A1 ° C. | A2 ° C. | T1 ° C. | T2 ° C. | T3 ° C. | Surface layer thickness μm | Volume resistivity Ω · cm | Q/M μC/g | Fogging % | Ghost |
|---|---|---|---|---|---|---|---|---|---|---|---|---|
| 21 | D-21 | T-1 | 395.5 | 392.5 | 382.6 | 378.5 | 379.6 | 15.0 | $5.1 \times 10^{13}$ | −16 | 2.7 | AA |
| 22 | D-22 | T-1 | 394.8 | 391.8 | 381.9 | 377.8 | 378.9 | 15.0 | $5.6 \times 10^{12}$ | −15 | 2.6 | AA |
| 23 | D-23 | T-1 | 394.5 | 391.5 | 381.6 | 377.5 | 378.6 | 15.0 | $4.0 \times 10^{11}$ | −13 | 2.9 | AA |
| 24 | D-24 | T-1 | 393.5 | 390.5 | 380.6 | 376.5 | 377.6 | 15.0 | $5.7 \times 10^{11}$ | −12 | 3.0 | AA |
| 25 | D-25 | T-1 | 396.6 | 393.6 | 383.7 | 379.6 | 380.7 | 15.0 | $8.2 \times 10^{14}$ | −20 | 2.0 | AA |
| 26 | D-26 | T-1 | 396.7 | 393.7 | 383.8 | 379.7 | 380.8 | 2.0 | $8.2 \times 10^{14}$ | −20 | 2.0 | AA |
| 27 | D-27 | T-1 | 396.7 | 393.7 | 383.8 | 379.7 | 380.8 | 150.0 | $8.2 \times 10^{14}$ | −21 | 1.9 | AA |
| 28 | D-28 | T-1 | 396.7 | 393.7 | 383.8 | 379.7 | 380.8 | 1.4 | $8.2 \times 10^{14}$ | −20 | 2.0 | AA |
| 29 | D-29 | T-1 | 396.7 | 393.7 | 383.8 | 379.7 | 380.8 | 160.0 | $8.2 \times 10^{14}$ | −21 | 1.9 | AA |
| 30 | D-30 | T-1 | 397.5 | 394.5 | 384.6 | 380.5 | 381.6 | 15.0 | $6.2 \times 10^{16}$ | −25 | 1.5 | B |
| 31 | D-31 | T-1 | 393.8 | 390.8 | 380.9 | 376.8 | 377.9 | 15.0 | $1.3 \times 10^{9}$ | −10 | 3.4 | AA |
| 32 | D-32 | T-1 | 396.7 | 393.7 | 383.8 | 383.8 | 383.8 | 15.0 | $8.2 \times 10^{14}$ | −22 | 1.9 | AA |
| 33 | D-2 | T-2 | 396.7 | 393.7 | 383.8 | 379.7 | 380.8 | 15.0 | $8.2 \times 10^{14}$ | −20 | 2.0 | AA |

Comparative Examples 1 to 3

Evaluations were performed in the same manner as in Example 1 except that the developing roller and the developer were changed to those shown in Table 14. The results are shown in Table 14.

TABLE 14

| Comparative Example | Developing roller | Developer | A1 ° C. | A2 ° C. | T1 ° C. | T2 ° C. | T3 ° C. | Surface layer thickness μm | Volume resistivity Ω · cm | Q/M μC/g | Fogging % | Ghost |
|---|---|---|---|---|---|---|---|---|---|---|---|---|
| 1 | DH-1 | T-1 | 370.1 | 368.1 | — | — | — | — | $4.3 \times 10^{14}$ | −5 | 5.8 | AA |
| 2 | DH-2 | T-1 | — | — | 379.1 | 379.1 | 379.1 | 15.0 | $6.2 \times 10^{14}$ | −9 | 4.7 | AA |
| 3 | D-2 | TH-1 | 396.7 | 393.7 | 383.8 | 379.7 | 380.8 | 15.0 | $8.2 \times 10^{14}$ | −7 | 5.1 | AA |

Discussion of Evaluation Results

In Examples 1 to 33, the developing devices are evaluated by using the developers each containing the magnetic substance. Each of the developing rollers to be stored in the developing devices includes the single-layer elastic layer serving as the surface layer, and the elastic layer contains the crosslinked urethane resin and the crosslinked acrylic resin as its binder resin. Further, it can be recognized that each of the developing rollers of Examples 1 to 33 satisfies a relationship of A1>A2, and hence the crosslinked urethane resin and the crosslinked acrylic resin form an interpenetrating polymer network structure in the first region from the outer surface of the elastic layer to a position at a depth of 0.1 μm from the outer surface of the surface layer. It is recognized from the foregoing that even under a high-temperature environment, the developer is satisfactorily charged, and hence the fogging performance of the developing device is satisfactory.

In each of Examples 1, 2, 7, 8, 13, 14, 19, 20, 25 to 30, 32, and 33 in each of which the crosslinked urethane resin including a polycarbonate structure is used as the binder resin of the surface layer of the developing roller, the Q/M is relatively high and the fogging performance of the developing device is satisfactory. In each of Examples 1, 7, 13, 19, and 30 in each of which the crosslinked urethane resin contains a methyl group in a side chain thereof out of those examples, the result is that the volume resistivity is particularly high and the fogging resistance of the device is excellent.

Meanwhile, in Comparative Example 1, the preliminary coating layer is subjected to the acrylic impregnation treatment, but a chemical structure (crosslinked urethane resin) that imparts charge to the developer is not incorporated, and hence the result is that the Q/M is low and the fogging performance of the developing device is poor. In Comparative Example 2, the crosslinked urethane resin and the chain acrylic resin are incorporated, but the interpenetrating polymer network structure of the crosslinked acrylic resin and the crosslinked urethane resin is not incorporated. In addition, in Comparative Example 3, no magnetic substance is incorporated into the developer. Accordingly, in each of those comparative examples, the result is that no effective charge impartment is performed and the fogging performance of the developing device is insufficient.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-038262, filed Mar. 10, 2021, which is hereby incorporated by reference herein in its entirety.

What is claimed is:

1. A developing device comprising:

a developer; and a developing member configured to carry the developer on a surface thereof, the developing member including an electro-conductive substrate and a single-layer elastic layer serving as a surface layer on the substrate, the surface layer comprising a binder resin, and the binder resin containing a crosslinked urethane resin and a crosslinked acrylic resin, the crosslinked urethane resin and the crosslinked acrylic resin forming an interpenetrating polymer network structure in a first region from an outer surface of the surface layer to a position at a depth of 0.1 μm from the outer surface of the surface layer, wherein the developer contains developer particles each containing at least a binder resin and a magnetic substance, the crosslinked urethane resin is a polycarbonate-modified urethane resin having, in its soft segment, a structure having a side-chain methyl group, and the binder resin incorporated into the surface layer (1) of the developing member has a volume resistivity of $1.0\times10^{10}$ Ω·cm or more and $1.0\times10^{18}$ Ω·cm or less.

2. The developing device according to claim 1, wherein when sampling a first sample from the first region and a peak top temperature of a thermal chromatogram derived from the crosslinked acrylic resin in the first sample is defined as A1(° C.), and when obtaining a second sample by decomposing the crosslinked urethane resin in the first sample, and a peak top temperature of a thermal chromatogram derived from the crosslinked acrylic resin in the second sample is defined as A2(° C.), A1 and A2 satisfy a relationship represented by formula (1):

$$A1>A2. \quad \text{Formula (1)}$$

3. The developing device according to claim 1, wherein when a peak top temperature of a thermal chromatogram derived from the crosslinked urethane resin in the first region is represented by T1(° C.), and a peak top temperature of a thermal chromatogram derived from the crosslinked urethane resin in a second region having a thickness of 0.1 μm from a rear surface of the surface layer on a side facing the substrate toward the outer surface is represented by T2(° C.), the T1 and the T2 satisfy a relationship represented by formula (2):

$$T1>T2. \quad \text{Formula (2)}$$

4. The developing device according to claim 3, wherein the T1 and the T2 satisfy a relationship represented formula (3):

$$(T1-T2)>1.0(^\circ \text{ C.}). \quad \text{Formula (3)}$$

5. The developing device according to claim 1, wherein the surface layer of the developing member has a thickness of 2.0 μm or more and 150.0 μm or less.

6. The developing device according to claim 5, wherein when a peak top temperature of a thermal chromatogram derived from the crosslinked urethane resin in the first region is represented by T1(° C.), a peak top temperature of a thermal chromatogram derived from the crosslinked urethane resin in a second region having a thickness of 0.1 μm from a rear surface of the surface layer on a side facing the substrate toward the outer surface is represented by T2(° C.), and a peak top temperature of a thermal chromatogram derived from the crosslinked urethane resin in a third region corresponding to a depth of 1.0 μm or more and 1.1 μm or less from the outer surface of the surface layer is represented by T3(° C.), the T1, the T2, and the T3 satisfy relationships represented by formula (4) and formula (5):

$$T1>T3; \text{ and} \quad \text{Formula (4)}$$

$$|T1-T3|>|T3-T2|. \quad \text{Formula (5)}$$

7. The developing device according to claim 1, wherein the surface layer of the developing member further contains one kind or a plurality of kinds of a modified silicone compound and a modified fluorine compound.

8. An electrophotographic process cartridge removably mountable onto a main body of an electrophotographic apparatus, the electrophotographic process cartridge comprising a developing device, wherein the developing device comprises a developer; and a developing member configured to carry the developer on a surface thereof, the developing member includes an electro-conductive substrate and a single-layer elastic layer serving as a surface layer on the substrate, the surface layer comprises a binder resin, and the binder resin contains a crosslinked urethane resin and a crosslinked acrylic resin, the crosslinked urethane resin and the crosslinked acrylic resin forms an interpenetrating polymer network structure in a first region from an outer surface of the surface layer to a position at a depth of 0.1 μm from the outer surface of the surface layer, and wherein the developer contains developer particles each containing at least a binder resin and a magnetic substance, the crosslinked urethane resin is a polycarbonate-modified urethane resin having, in its soft segment, a structure having a side-chain methyl group, and the binder resin incorporated into the surface layer (1) of the developing member has a volume resistivity of $1.0 \times 10^{10}$ Ω·cm or more and $1.0 \times 10^{18}$ Ω·cm or less.

9. An electrophotographic image forming apparatus comprising:

an image-bearing member for bearing an electrostatic latent image;

a charging device for primarily charging the image-bearing member;

an exposing device for forming an electrostatic latent image on the image-bearing member that is primarily charged;

a developing device for developing the electrostatic latent image with a developer to form a developer image; and a transferring device for transferring the developer image onto a transfer material, wherein the developing device comprises a developer; and a developing member configured to carry the developer on a surface thereof, the developing member includes an electro-conductive substrate and a single-layer elastic layer serving as a surface layer on the substrate, the surface layer comprises a binder resin, and the binder resin contains a crosslinked urethane resin and a crosslinked acrylic resin, the crosslinked urethane resin and the crosslinked acrylic resin forms an interpenetrating polymer network structure in a first region from an outer surface of the surface layer to a position at a depth of 0.1 μm from the outer surface of the surface layer, and wherein the developer contains developer particles each containing at least a binder resin and a magnetic substance, the crosslinked urethane resin is a polycarbonate-modified urethane resin having, in its soft segment, a structure having a side-chain methyl group, and the binder resin incorporated into the surface layer (1) of the developing member has a volume resistivity of $1.0 \times 10^{10}$ Ω·cm or more and $1.0 \times 10^{18}$ Ω·cm or less.

10. The electrophotographic image forming apparatus according to claim 9, wherein the developing device is a developing device of a magnetic contact system.

11. A developing device comprising:

a developer; and a developing member configured to carry the developer on a surface thereof, the developing member including an electro-conductive substrate and a single-layer elastic layer serving as a surface layer on the substrate, the surface layer comprising a binder resin, and the binder resin containing a crosslinked urethane resin and a crosslinked acrylic resin, wherein a first region from an outer surface of the surface layer to a position at a depth of 0.1 μm from the outer surface of the surface layer contains both of the crosslinked urethane resin and the crosslinked acrylic resin, wherein when sampling a first sample from the first region and a peak top temperature of a thermal chromatogram derived from the crosslinked acrylic resin in the first sample is defined as A1(° C.), and when obtaining a second sample by decomposing the crosslinked urethane resin in the first sample, and a peak top temperature of a thermal chromatogram derived from the crosslinked acrylic resin in the second sample is defined as A2(° C.), A1 and A2 satisfy a relationship represented by formula (1):

$$A1 > A2, \text{ and} \qquad \text{Formula (1)}$$

wherein the developer contains developer particles each containing at least a binder resin and a magnetic substance, the crosslinked urethane resin is a polycarbonate-modified urethane resin having, in its soft segment, a structure having a side-chain methyl group, and the binder resin incorporated into the surface layer (1) of the developing member has a volume resistivity of $1.0 \times 10^{10}$ Ω·cm or more and $1.0 \times 10^{18}$ Ω·cm or less.

* * * * *